United States Patent
Teranishi et al.

(10) Patent No.: US 8,866,710 B2
(45) Date of Patent: Oct. 21, 2014

(54) LIQUID CRYSTAL DISPLAY PANEL AND ELECTRONIC DEVICE

(75) Inventors: Yasuyuki Teranishi, Kanagawa (JP); Yoshiharu Nakajima, Kanagawa (JP)

(73) Assignee: Japan Display Inc., Chita (JP)

( * ) Notice: Subject to any disclaimer, the term of this patent is extended or adjusted under 35 U.S.C. 154(b) by 703 days.

(21) Appl. No.: 12/634,462

(22) Filed: Dec. 9, 2009

(65) Prior Publication Data

US 2010/0149080 A1    Jun. 17, 2010

(30) Foreign Application Priority Data

Dec. 17, 2008  (JP) ................................. 2008-321652

(51) Int. Cl.
*G09G 3/36* (2006.01)

(52) U.S. Cl.
CPC .......... *G09G 3/3648* (2013.01); *G09G 2310/08* (2013.01); *G09G 2300/0852* (2013.01)
USPC ......................................................... 345/87

(58) Field of Classification Search
None
See application file for complete search history.

(56) References Cited

U.S. PATENT DOCUMENTS

| | | | |
|---|---|---|---|
| 2002/0075205 A1* | 6/2002 | Kimura et al. | 345/55 |
| 2002/0075211 A1* | 6/2002 | Nakamura | 345/87 |
| 2003/0016202 A1 | 1/2003 | Edwards et al. | |
| 2003/0098860 A1* | 5/2003 | Nakamura et al. | 345/211 |

FOREIGN PATENT DOCUMENTS

| | | |
|---|---|---|
| JP | 2002-156922 | 5/2002 |
| JP | 2002-169136 | 6/2002 |
| JP | 2002-229532 | 8/2002 |
| JP | 2003-108081 | 1/2003 |
| JP | 2003-108031 | 4/2003 |
| JP | 2003-228347 | 8/2003 |
| JP | 2004-191574 | 7/2004 |
| JP | 2005-258007 | 9/2005 |
| KR | 1020040010522 | 1/2004 |

* cited by examiner

*Primary Examiner* — Nicholas Lee
(74) *Attorney, Agent, or Firm* — Robert J. Depke; The Chicago Technology Law Group, LLC

(57) ABSTRACT

An LCD panel having analog display mode and memory display mode includes a capacitive element and first to third switch elements. The first switch element turns ON during a first operation for writing pixel potential from a signal line to the capacitive element, and turns OFF during a second operation. The second and third switch elements turn OFF during the first operation. The second switch element turns ON during a readout period of a second operation, to read out the pixel potential from the capacitive element. The third switch element turns ON during a write period in the second operation, to rewrite the pixel potential into the capacitive element.

6 Claims, 31 Drawing Sheets

71

71

LIQUID CRYSTAL DISPLAY PANEL AND ELECTRONIC DEVICE

The present application claims priority to Japanese Patent Application JP 2008-321652 filed in the Japanese Patent Office on Dec. 17, 2008, the entire content of which is hereby incorporated by reference.

BACKGROUND OF THE INVENTION

1. Field of the Invention

The invention relates to a liquid crystal display panel having a pixel structure meeting both an analog display mode and a memory display mode. The invention further relates to an electronic device mounted with the liquid crystal display panel.

2. Description of the Related Art

Recently, some liquid crystal display panel may meet both of display in an analog display mode and display in a memory display mode (for example, see Japanese Patent Application Unexamined Publication No. H09-243995). The analog display mode means a display mode in which a pixel gray-scale may be analogously expressed with multiple gray-scales in a minimum display unit (called "sub pixel" in the specification). The memory display mode means a display mode in which a pixel gray-scale may be expressed with two gray-scales of white and black based on binary information (H level or L level) stored in a memory.

In the memory display mode, operation of writing gray-scale potential need not be performed with a frame period. Therefore, power consumption can be reduced in the memory display mode compared with in the analog display mode.

SUMMARY OF THE INVENTION

FIGS. 1 and 2 show pixel circuit examples of a liquid crystal display panel meeting both the analog display mode and the memory display mode, respectively. The pixel circuits of FIGS. 1 and 2 show a case where SRAM is used for a memory within a sub pixel respectively. FIG. 1 shows a pixel circuit example when one SRAM is disposed for one sub pixel. FIG. 2 shows a pixel circuit example when one SRAM is disposed for three sub pixels.

In FIG. 1, LC shows a liquid crystal corresponding to the sub pixel. However, in FIG. 2, LC is omitted to be shown for convenience of drawing.

In FIG. 1, Cs is a holding capacitance holding gray-scale potential. In FIG. 2, three holding capacitances are shown as Cs(B), Cs(G) and Cs(R). B in the parenthesis shows a holding capacitance used for a sub pixel corresponding to blue. G in the parenthesis shows a holding capacitance used for a sub pixel corresponding to green. R in the parenthesis shows a holding capacitance used for a sub pixel corresponding to red.

Each of thin film transistors N1, N1(B), N1(G) and N1(R) is an active element that is controlled to be ON during a period of writing gray-scale potential to a corresponding holding capacitance Cs, and controlled to be OFF during other periods. Control lines CTL1, CTL1(B), CTL1(G) and CTL1(R) are used for the thin film transistors N1, N1(B), N1(G) and N1(R) respectively. In FIG. 2, ON periods of the thin film transistors N1, N1(B), N1(G) and N1(R) are time-sequentially arranged.

In FIG. 1, the thin film transistor N2 is an active element that is controlled to be ON during a period of writing gray-scale potential to corresponding, one sub pixel. In FIG. 2, the thin film transistor N2 is an active element that is controlled to be ON during a period of writing gray-scale potential to one of corresponding, three sub pixels. In FIG. 2, gray-scale potential is finally written to the sub pixel corresponding to blue.

The thin film transistor N3 is an active element that is controlled to be ON when gray-scale potential is written in the analog display mode, or when electric potential VXCS different from that of a counter electrode is written in the memory display mode. Holding potential of SRAM (P1, P2, N6 and N7) is used for such control. In the case of the circuit example, when the transistor N3 is ON, the transistor N4 is OFF, and when the transistor N3 is OFF, the transistor N4 is ON.

The thin film transistor N4 is an active element that is controlled to be ON when the same potential as that of the counter electrode is written to the holding capacitance in the memory display mode.

The thin film transistor N5 is an active element that is controlled to be ON when control potential is written to the SRAM (P1, P2, N6 and N7). A control line CTL2 is used for controlling the thin film transistor N5. The thin film transistor N5 is controlled to be ON or OFF such that the thin film transistor N3 may be controlled to be ON when gray-scale potential is written in the analog display mode, or when electric potential VXCS different from that of the counter electrode is written in the memory display mode.

Some difficulties still exist in the pixel circuits of FIGS. 1 and 2. One of the difficulties is a fact that large area is required for forming the SRAM. It is particularly pointed out that when one SRAM is arranged for one sub pixel, transmissive aperture ratio is reduced.

In addition, when high display resolution is required for a liquid crystal display panel, it is technically difficult to dispose one SRAM within one sub pixel. This leads to a difficulty that the resolution is limited when the circuit configuration of FIG. 1 or 2 is employed.

It is desirable to provide a liquid crystal display panel having a memory display mode and an electronic device, capable of avoiding reduction in transmissive aperture ratio and achieving high resolution.

A liquid crystal display panel according to an embodiment of the invention includes: a capacitive element holding pixel potential representing a gray-scale level and provided in each of pixels; a first switch element having a first terminal connected to one electrode of the capacitive element and to a drive electrode in a liquid crystal element, and having a second terminal connected to a signal line, the first switch element being controlled to be ON during a first operation period where pixel potential is written from the signal line to the capacitive element, and controlled to be OFF during a second operation period where readout of the pixel potential from the capacitive element, inversion and amplification of the read out pixel potential, and rewriting of the inverted-amplified pixel potential to the capacitive element are sequentially performed; a second switch element having a first terminal connected to a first terminal of the first switch element, the second switch element being controlled to be OFF during the first operation period, and controlled to be ON during a readout period where pixel potential stored in the capacitive element is read out, the readout period being one part of the second operation period; a third switch element having a first terminal connected to the first terminal of the first switch element, the third switch element being controlled to be OFF during the first operation period, and controlled to be ON during a write period where the pixel potential is written into the capacitive element, the write period being another part of the second operation period; and a circuit restoring a logic level of pixel potential read out from the capacitive element through the second switch element during the readout period, and then writing logically-inverted output having the restored logic level to the capacitive element through the third switch element during the write period.

An electronic device according to an embodiment of the invention includes the liquid crystal display panel described above.

In the liquid crystal display panel and the electronic device according to the embodiments of the invention, the second switch element and the third switch element are controlled to be OFF during the first operation period, and the pixel potential of the signal line is written to the capacitive element at the timing when the first switch element is controlled to be ON. On the other hand, the first switch element is controlled to be OFF, and in this state, the second switch element is controlled to be ON and the third switch element is controlled to be OFF during the second operation period. Thereby, the pixel potential held by the capacitive element is read by the circuit, and a logic level of the read pixel potential is restored. That is, a self-refresh function is performed. Then, the second switch element is controlled to be OFF, and the third switch element is controlled to be ON. Thereby, the logically-inverted output of the restored logic level is written by the circuit to the capacitive element through the third switch element. That is, a self-inverting function is performed.

According to the liquid crystal display panel and the electronic device of the embodiments of the invention, the capacitive element in each pixel is used as DRAM and refresh operation is completed within the circuit. Therefore, it is possible to avoid reduction in transmissive aperture ratio and to achieve high resolution. Also, the signal line having a large load capacity need not be charged or discharged during the refresh operation. Therefore, it is possible to reduce power consumption associated with the refresh operation.

Other and further objects, features and advantages of the invention will appear more fully from the following description.

DETAILED DESCRIPTION OF THE PREFERRED EMBODIMENTS

Hereinafter, embodiments of the invention will be described with reference to accompanied drawings.

Figure 3:
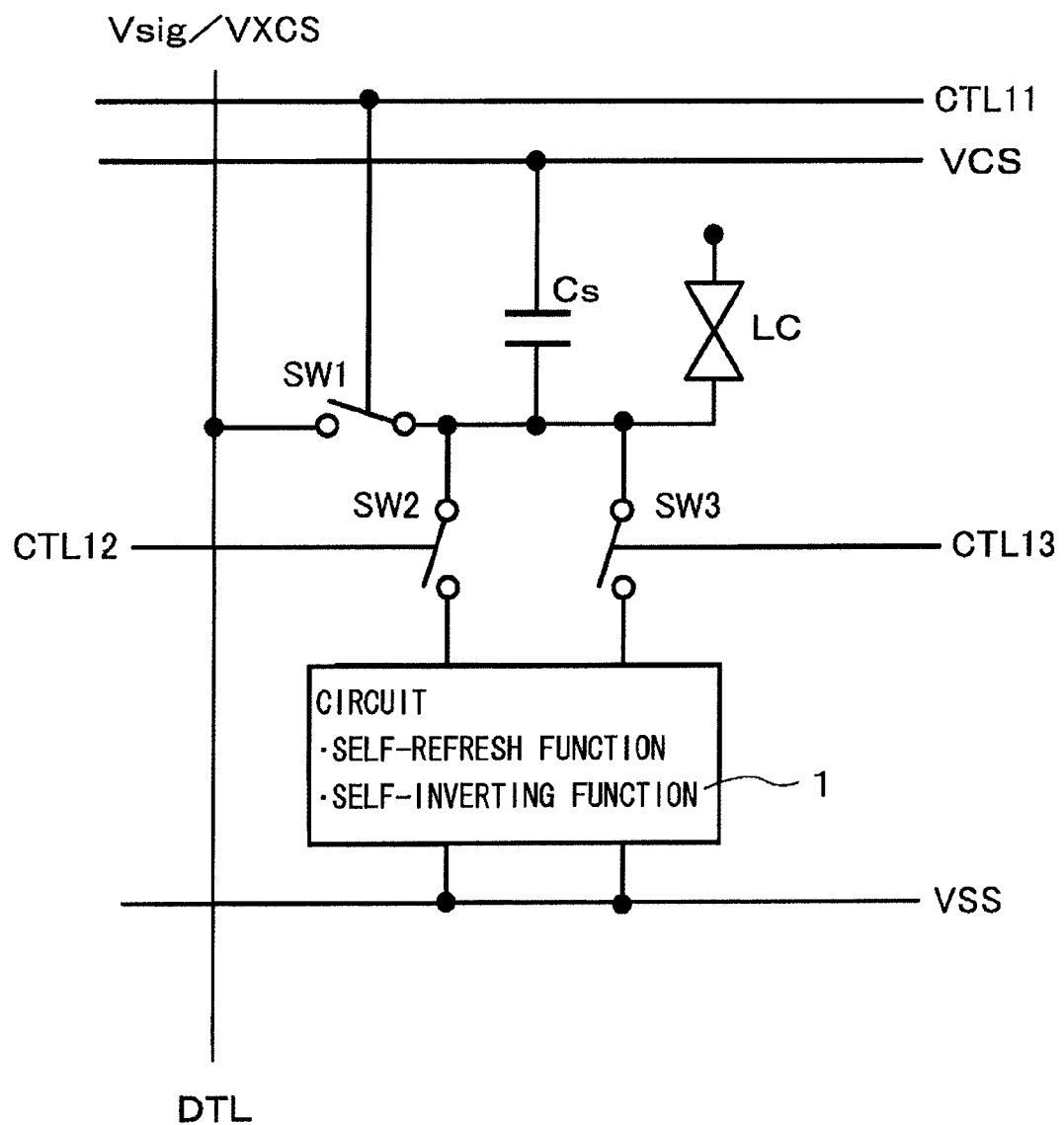
FIG. 3 is a diagram showing a pixel structure example of a liquid crystal display panel according to an embodiment of the invention.

A liquid crystal display panel according to one embodiment of the invention employs a pixel circuit utilizing a capacitive element holding gray-scale potential as DRAM, and includes the following elements (1) to (5) illustrated in FIG. 3.

(1) A capacitive element Cs holding pixel potential representing a gray-scale level and provided in each of pixels.

(2) A first switch SW1 having a first terminal connected to one electrode of the capacitive element and to a drive electrode in a liquid crystal element, and having a second terminal connected to a signal line. The first switch is controlled to be ON during a first operation period where pixel potential is written from the signal line to the capacitive element, and controlled to be OFF during a second operation period where readout of the pixel potential from the capacitive element, inversion and amplification of the read out pixel potential, and rewriting of the inverted-amplified pixel potential to the capacitive element are sequentially performed.

(3) A second switch SW2 having a first terminal connected to a first terminal of the first switch. The second switch is controlled to be OFF during the first operation period, and controlled to be ON during a readout period where pixel potential stored in the capacitive element is read out. The readout period is one part of the second operation period.

(4) A third switch SW3 having a first terminal connected to the first terminal of the first switch element. The third switch is controlled to be OFF during the first operation period, and controlled to be ON during a write period where the pixel potential is written into the capacitive element. The write period is another part of the second operation period.

(5) A circuit 1 restoring a logic level of pixel potential read out from the capacitive element through the second switch during the readout period, and then writing logically-inverted output having the restored logic level to the capacitive element through the third switch during the write period.

In the following, embodiments of the invention will be described with reference to FIG. 4 to FIG. 31. The description will be given in the following order.
(A) Basic Structure of Liquid Crystal Display Panel
(B) First Embodiment: One Circuit 1 Per Sub Pixel
   (B-1) System Configuration Example
   (B-2) Configuration of Pixel Circuit
   (B-3) Drive Operation Example
   (B-4) Conclusion
(C) Second Embodiment: One Circuit 1 Per Three Sub Pixels
   (C-1) Configuration of Pixel Circuit
   (C-2) Drive Operation Example
   (C-3) Conclusion
(D) Third Embodiment: One Circuit 1 Per Six Sub Pixels
   (D-1) Configuration of Pixel Circuit
   (D-2) Drive Operation Example
   (D-3) Conclusion
(E) Other Embodiments It will be appreciated that the invention is not limited to embodiments.

(A) Basic Structure of Liquid Crystal Display Panel (A-1) Outside Structure

First, an example of outside appearance of a liquid crystal display panel is described. As used herein, the term "liquid crystal display panel" refers not only to a panel module where a pixel array section and a drive circuit are formed using the same process, but also to a panel module where a drive circuit configured as an integrated circuit is mounted on a panel provided with a pixel array section. The integrated circuit here corresponds to "semiconductor device".

Figure 4:
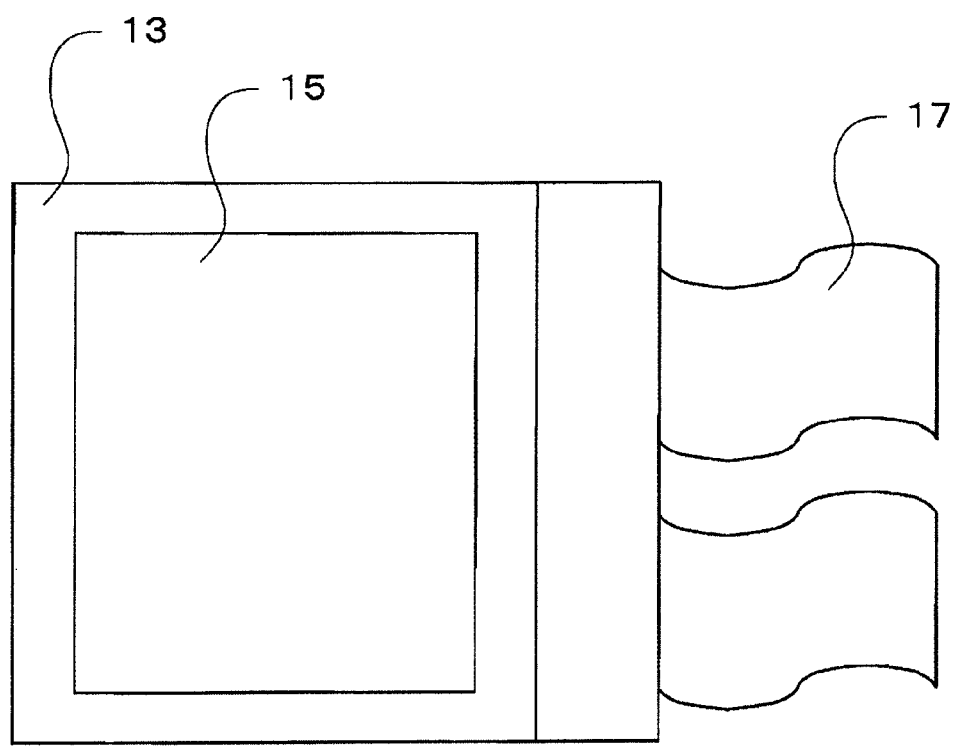
FIG. 4 is a diagram showing an example of outside appearance of a liquid crystal display panel.

FIG. 4 shows the example of outside appearance of the liquid crystal display panel. The liquid crystal display panel 11 has a structure where a support substrate 13 is attached with a counter substrate 15.

The support substrate 13 includes glass, plastic or another transmissive material. The counter substrate 15 also includes glass, plastic or another transmissive material. The counter substrate 15 is a member sealing a surface of the support substrate 13 with a seal material in between.

In addition, FPC (Flexible Printed Circuit) 7 is disposed on the liquid crystal display panel 11 for inputting an external signal or drive power as necessary.

(A-2) Sectional Structure

Figure 5:
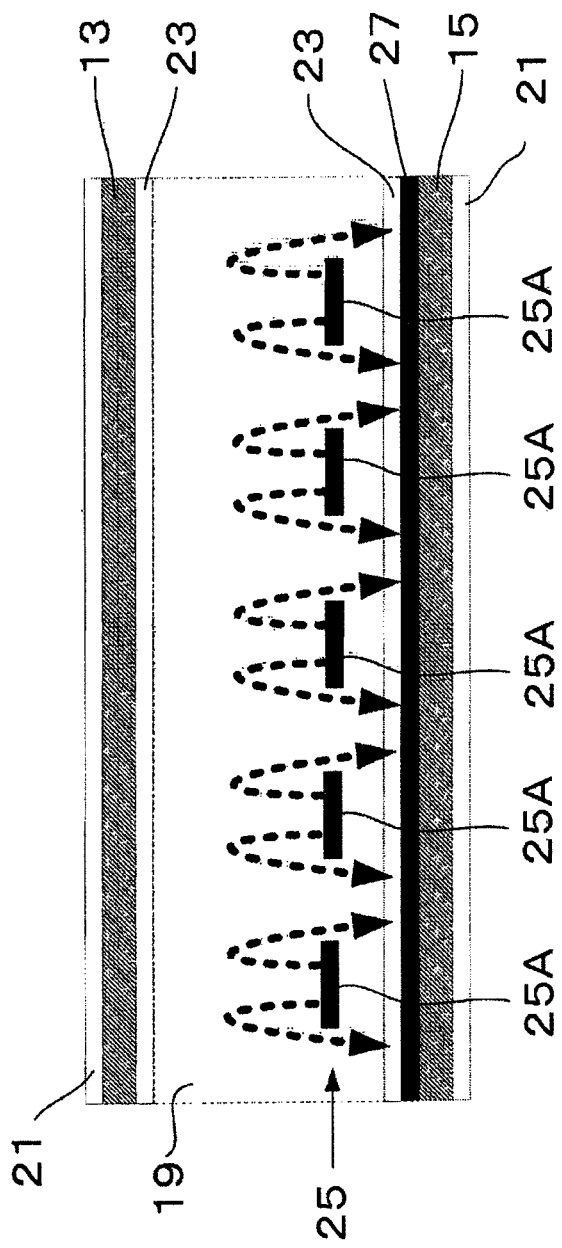
FIG. 5 is a diagram showing a sectional structure example of the liquid crystal display panel.

FIG. 5 shows a sectional structure example of the liquid crystal display panel. The liquid crystal display panel 11 of FIG. 5 includes two glass substrates 13 and 15, and a liquid crystal layer 19 enclosed in a manner of being sandwiched by the substrates. A polarizing plate 21 is disposed on an outer surface of each substrate, and an alignment film 23 is disposed on an inner surface thereof. The alignment film 23 is used for arranging liquid crystal molecules of the liquid crystal layer 19 in a certain direction. A polyimide film is typically used for the film 23.

Pixel electrodes 25 and counter electrodes 27 are formed on the glass substrate 15, the electrodes 25 and 27 being formed of a transparent conductive film respectively. In FIG. 5, pixel electrodes 25 have a structure where five electrode branches 25A formed into a comb shape are connected at either ends via connections.

In contrast, the counter electrodes 27 are formed on a lower layer side (glass substrate 15 side) with respect to the electrode branches 25A in a manner of covering the whole pixel area. This electrode structure induces a parabolic electric field between the electrode branches 25A and the counter electrodes 27. That is, even regions on tops of the electrode branches 25A may be affected by the electric field. Therefore, a liquid crystal in the whole pixel area may be directed to a desired orientation direction.

(B) First Embodiment (B-1) System Configuration Example

First, description is made on a system configuration of a liquid crystal display panel 31 having a pixel structure according to the present embodiment.

Figure 6:
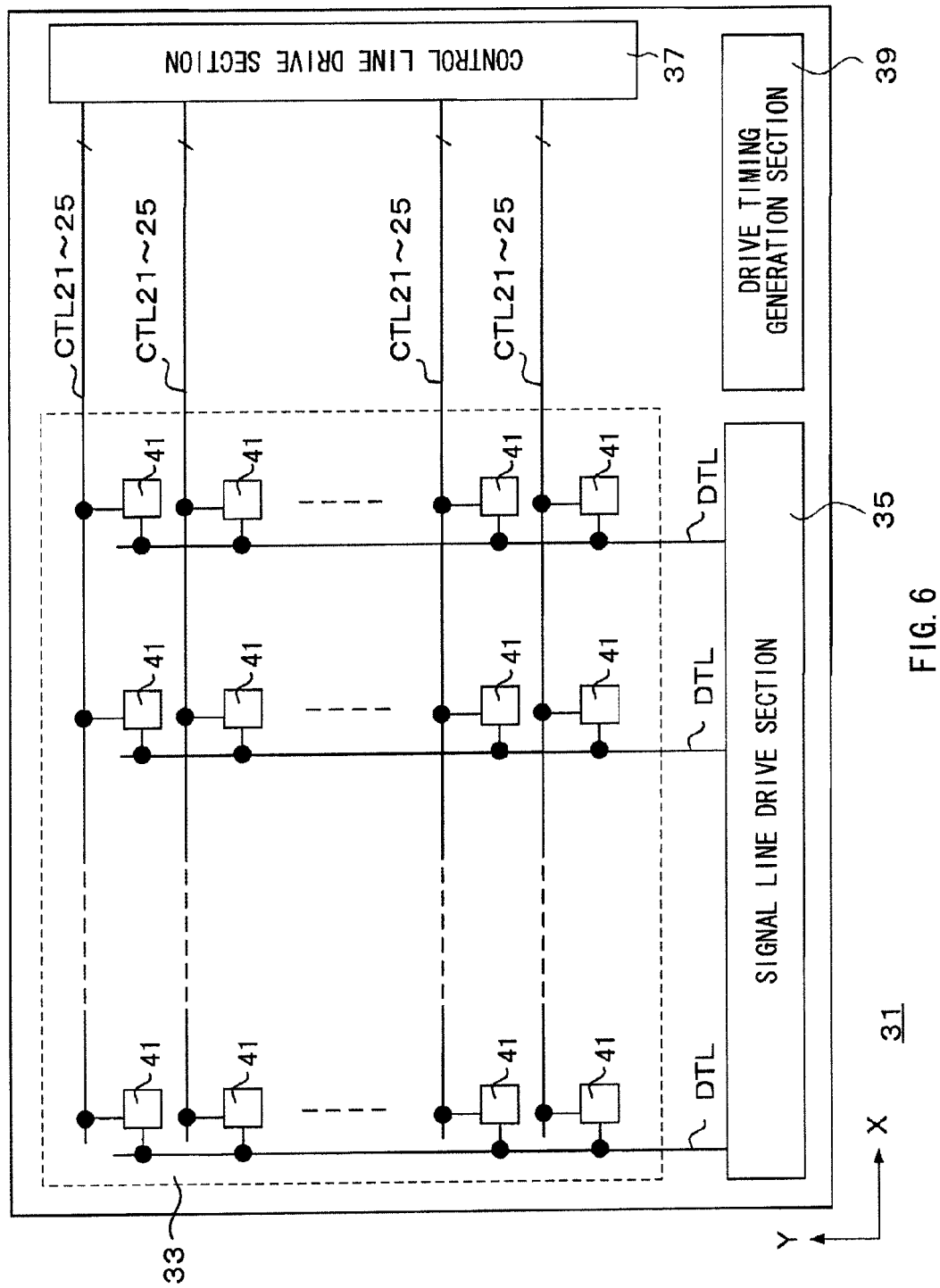
FIG. 6 is a diagram showing a system configuration example of the liquid crystal display panel.

FIG. 6 shows a system configuration example of the liquid crystal display panel module 31. The module 31 has a configuration where a pixel array section 33, a signal line drive section 35, a control line drive section 37, and a drive timing generation section 39 are arranged on a lower glass substrate (corresponding to the glass substrate 15 in FIG. 5). In the embodiment, a drive circuit of the pixel array section 33 is formed as one or plural semiconductor integrated circuit/circuits, and mounted on the glass substrate.

The pixel array section 33 has a matrix structure where white units, each unit configuring one pixel of display, are arranged in M rows and N columns. As used herein, the term "row" refers to a pixel line configured of 3*N sub pixels 41 arranged in an X axis direction in the figure. The term "column" refers to a pixel line configured of M sub pixels 41 arranged in a Y axis direction in the figure. Note that a value of M and a value of N are determined according to display resolution in a vertical direction and display resolution in a horizontal direction respectively.

Figure 7:
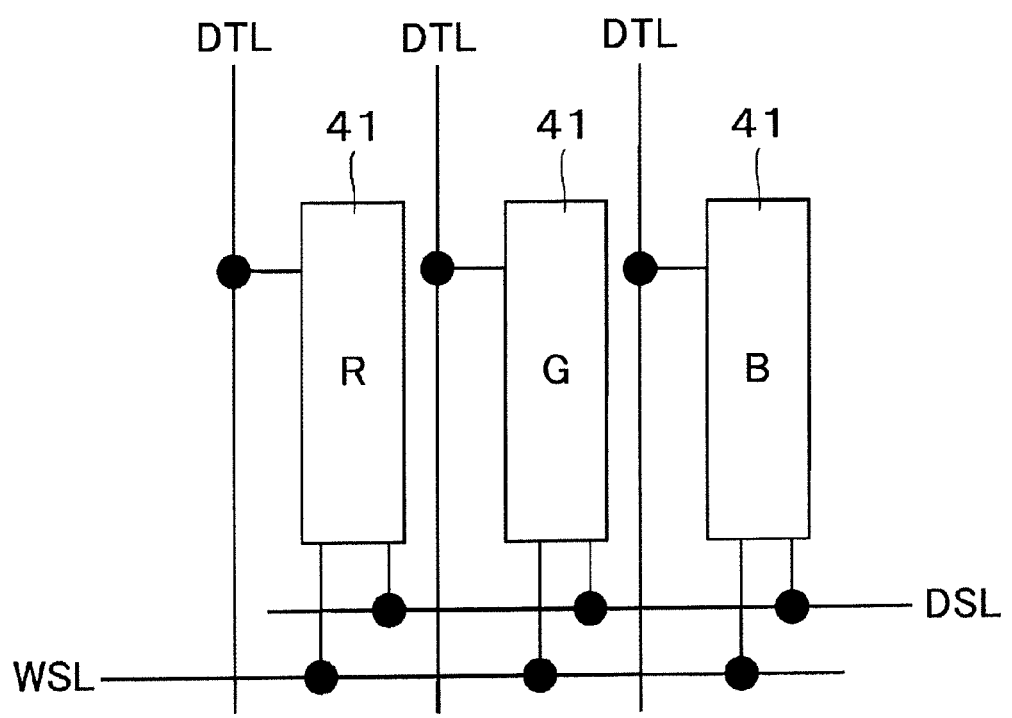
FIG. 7 is a diagram showing an arrangement example of sub pixels.

FIG. 7 shows an arrangement example of the sub pixels 41 configuring white units. The example of FIG. 7 is an arrangement example when a white unit is configured of sub pixels 41 corresponding to three primary colors. Note that a configuration of a white unit is not limited to this.

The signal line drive section 35 is a circuit driving signal lines DTL. In the present embodiment, the signal lines DTL are wired extending in the Y axis direction in the figure. For example, in the analog display mode, the signal line drive section 35 operates so that optional gray-scale potential (analog potential Vsig) in accordance with pixel gray-scale is applied to a corresponding signal line DTL. For example, even in the memory display mode, when a logic level of gray-scale potential to be stored in a sub pixel 41 is changed, the section 35 operates so that necessary pixel gray-scale is applied to a corresponding signal line DTL.

The control line drive section 37 is a circuit driving control lines CTL 21 to 25. In the present embodiment, the control lines CTL 21 to 25 are wired extending in the X axis direction in the figure. For example, in the analog display mode, the section 37 controls operation of writing gray-scale potential applied to a signal line DTL to a sub pixel 41. For example, in the memory display mode, the section 37 controls refresh operation of gray-scale potential stored in a sub pixel 41, and rewriting operation.

The drive timing generation section 39 is a circuit device supplying a drive pulse to the signal line drive section 35 and to the control line drive section 37.

(B-2) Configuration of Pixel Circuit

Figure 8:
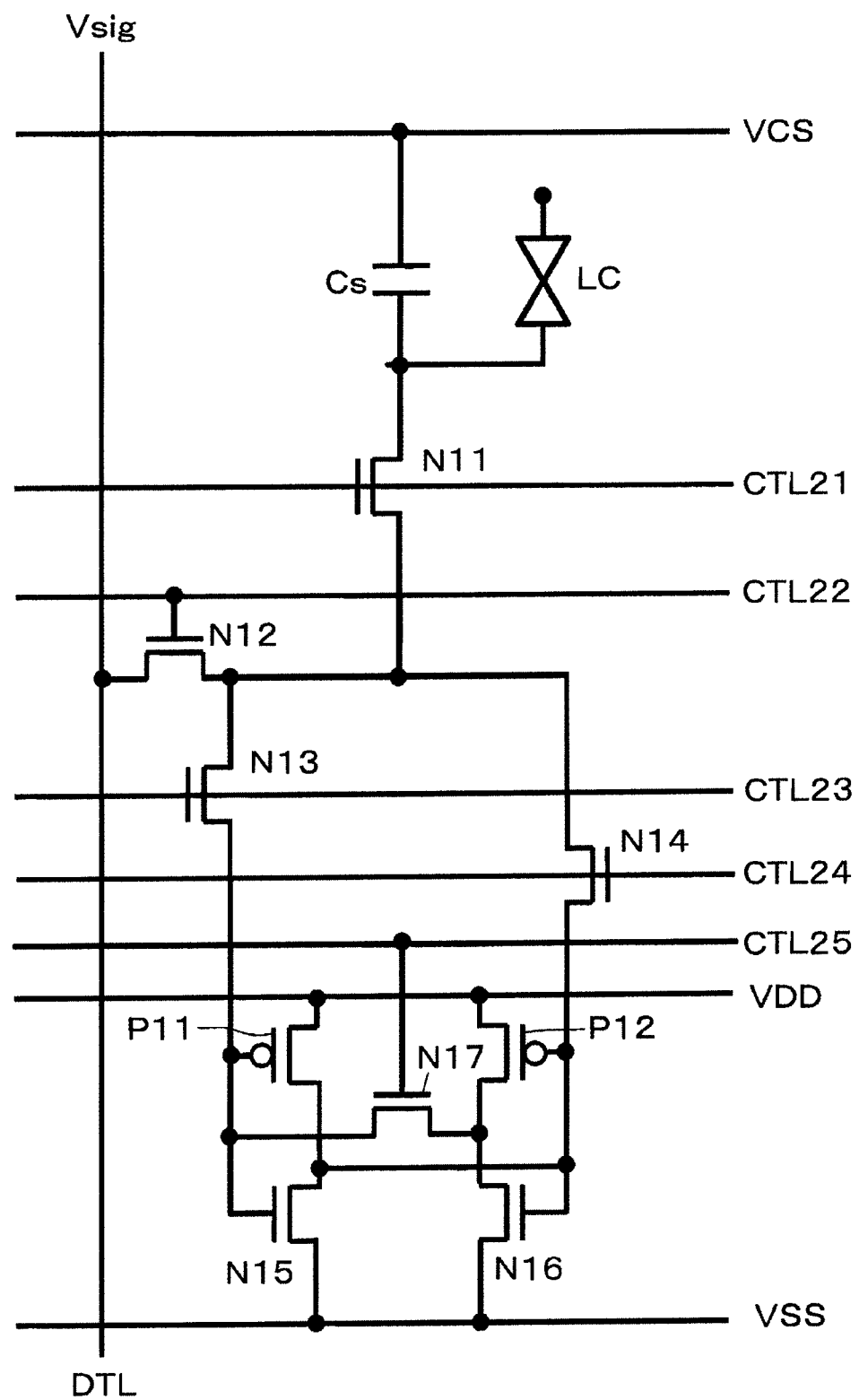
FIG. 8 is a diagram showing a configuration example of a pixel circuit according to a first embodiment.

FIG. 8 shows a configuration example of a pixel circuit corresponding to the sub pixel 41 according to the present embodiment. FIG. 8 shows a circuit configuration as a circuit configuration example when the circuit 1 (FIG. 3) having a self-refresh function and a self-inverting function is disposed in one-to-one correspondence to the sub pixel 41.

Hereinafter, each of elements configuring the pixel circuit is described.

In FIG. 8, LC shows a liquid crystal corresponding to the sub pixel 41.

In FIG. 8, "Cs" shows a holding capacitance holding gray-scale potential. In the present embodiment, the holding capacitance Cs is used as DRAM in the memory display mode.

A thin film transistor N11 is an active element that is controlled to be ON during writing gray-scale potential to the holding capacitance Cs, and controlled to be OFF during other periods. A control line CTL21 is used for controlling the thin film transistor N11. One main electrode of the transistor N11 is connected to wiring connected to a pixel electrode, and the other main electrode is connected to one main electrode of a thin film transistor N12 through wiring.

The thin film transistor N12 is an active element that is controlled to be ON when gray-scale potential is written from the signal line DTL. A control line CTL22 is used for controlling the thin film transistor N12. The thin film transistor N12 corresponds to the first switch SW1 in FIG. 3. One main electrode of the transistor N12 is connected to the signal line DTL, and the other main electrode thereof is connected to the one main electrode of the thin film transistor N11 through wiring.

A thin film transistor N13 is an active element that is controlled to be OFF when pixel potential is written from the signal line to the holding capacitance. The transistor N13 is controlled to be ON only for a certain period immediately before end of each frame during performing internal refresh operation of the memory display mode. Gray-scale potential held by the holding capacitance Cs acting as DRAM is read by the circuit 1 (FIG. 3) during a period where the thin film transistor N13 is controlled to be ON. A control line CTL23 is used for controlling the thin film transistor N13. The thin film transistor N13 corresponds to the second switch SW2 in FIG. 3.

A thin film transistor N14 is also an active element that is controlled to be OFF when pixel potential is written from the signal line to the holding capacitance. The transistor N14 is controlled to be ON only for a certain period immediately after start of each frame during performing internal refresh operation of the memory display mode. Gray-scale potential, which has been inverted in logic within the circuit 1 (FIG. 3), is written to the holding capacitance Cs during a period where the thin film transistor N14 is controlled to be ON. A control line CTL24 is used for controlling the thin film transistor N14. The thin film transistor N14 corresponds to the third switch SW3 in FIG. 3.

Thin film transistors P11, P12, N15, N16 and N17 configure the circuit 1 in FIG. 3.

The thin film transistors P11 and N15 configure an inverter circuit (amplifier circuit). In addition, the thin film transistors P12 and N16 configure an inverter circuit (amplifier circuit). Drive power of the inverter circuits includes high-level power of VDD and low-level power of VSS.

An input side of the inverter circuit including the thin film transistors P11 and N15 is connected to one main electrode of the thin film transistor N13. The inverter circuit may input gray-scale potential of the holding capacitance Cs when the transistor N13 is ON.

An input side of the inverter circuit including the thin film transistors P12 and N16 is connected to one main electrode of the thin film transistor N14. The inverter circuit may write gray-scale potential inverted in logic to the holding capacitance Cs when the transistor N14 is ON.

An output side of the inverter circuit including the thin film transistors P11 and N15 is connected to an input side of the inverter circuit including the thin film transistors P12 and N16. An output side of the inverter circuit including the thin film transistors P12 and N16 is connected to the input side of the inverter circuit including the thin film transistors P11 and N15 through a thin film transistor N17. The thin film transistor N17 controls operation of the circuit 1 (FIG. 3). A control line CTL25 is used for controlling the thin film transistor N17.

For example, when the thin film transistor N17 is ON, the two inverter circuits operate as a latch circuit. When the inverter circuits operate as the latch circuit, a self-refresh function is enabled. That is, operation of restoring a logic level is performed so as to have logic amplitude of VDD to VSS. Logically-inverted output of gray-scale potential read from the holding capacitance Cs is provided on the output side of the inverter circuit including the thin film transistors P11 and N15.

In addition, for example, when the thin film transistor N17 is OFF, the two inverter circuits operate as independent amplifier circuits.

(B-3) Drive Operation Example

Figure 9:
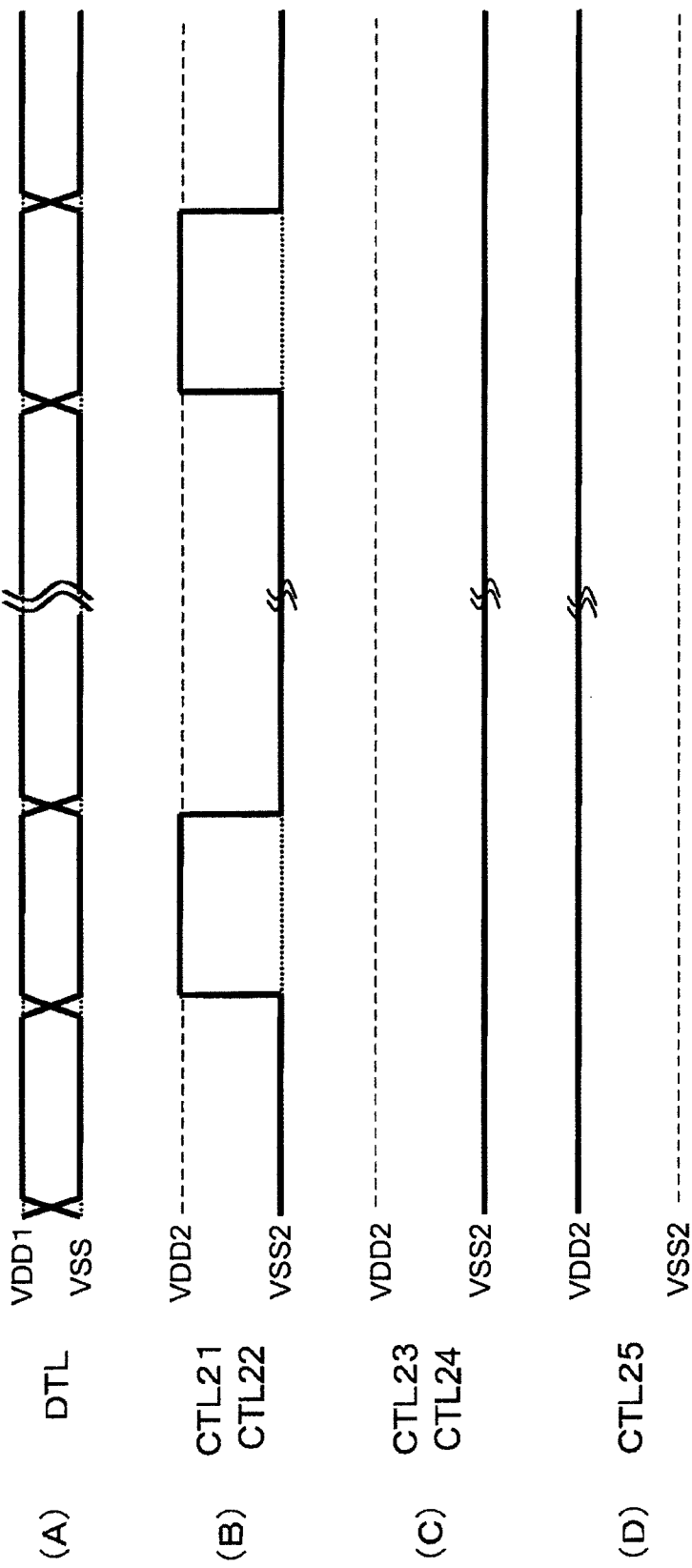
FIG. 9 is a diagram showing a drive operation example in an analog display mode.

Hereinafter, drive operation examples of the pixel circuit configuring the sub pixel 41 are described for each display mode.
(1) Analog Display Mode FIG. 9 shows specific control operation of the control line drive section 37 for a certain scan line in the analog display mode. In FIG. 9, (A) shows a waveform of gray-scale potential applied to the signal line DTL. In the present embodiment, polarity of voltage applied between a pixel electrode and a counter electrode is inverted on a horizontal-period cycle (1H cycle). That is, line inversion drive is performed. Therefore, in (A), the waveform of gray-scale potential applied to the signal line DTL is drawn such that a potential level is inverted on a 1H cycle. High-level potential of the gray-scale potential applied to the signal line DTL is VDD1, and low-level potential thereof is VSS. While (A) shows an example of a case of the largest amplitude, a potential level between VDD1 and VSS is actually used depending on pixel gray-scale.

In FIG. 9, (B) shows a drive waveform of each of the control lines CTL21 and CTL22. High-level potential of drive amplitude is VDD2, and low-level potential thereof is VSS2. As shown in the figure, drive potential is controlled to be high-level potential VDD2 only at the timing of writing gray-scale potential from the signal line DTL.

(C) shows a drive waveform of each of the control lines CTL23 and CTL24. High-level potential of drive amplitude is VDD2, and low-level potential thereof is VSS2. However, the control lines CTL23 and CTL24 are continuously controlled at the low-level potential VSS2 in the analog display mode.

(D) shows a drive waveform of the control line CTL25. High-level potential of drive amplitude is VDD2, and low-level potential thereof is VSS2. However, the control line CTL25 is continuously controlled at the high-level potential VDD2 in the analog display mode.

Figure 10:
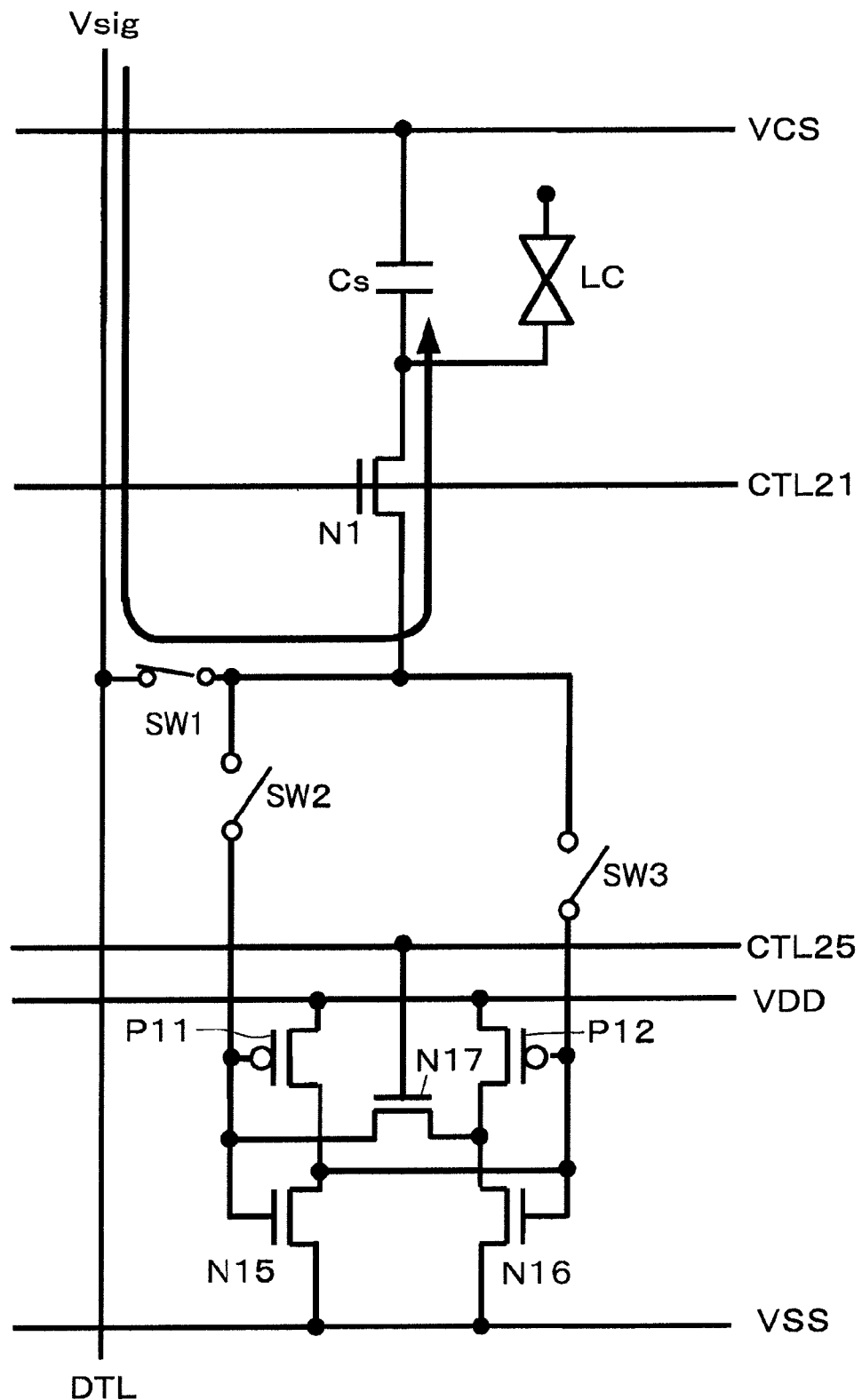
FIG. 10 is a diagram showing a connection condition within a pixel circuit in the analog display mode.

FIG. 10 shows a connection condition within a pixel circuit when gray-scale potential is written from the signal line DTL in the analog display mode. A writing path of the gray-scale potential is shown by an arrow.

In this case, only the thin film transistor N12 corresponding to the first switch SW1 is controlled to be ON as shown in FIG. 10. In contrast, both of the thin film transistor N13 corresponding to the second switch SW2 and the thin film transistor N14 corresponding to the third switch SW3 are controlled to be OFF over the whole period. That is, a portion of the pixel circuit including the holding capacitance Cs and a pixel electrode is electrically perfectly isolated from the circuit 1 (FIG. 3).

The thin film transistor N17 in the circuit 1 is continuously controlled to be ON, and thus continuously operates as a latch circuit.

(2) Memory Display Mode

The memory display mode includes operation of writing gray-scale potential from the signal line DTL to the holding capacitance Cs, and operation of refreshing gray-scale potential stored in the holding capacitance Cs within a sub pixel. The operation of writing gray-scale potential from the signal line DTL to the holding capacitance Cs is performed, for example, when display contents are changed. When gray-scale potential is written from the signal line DTL to the holding capacitance Cs, operation of the pixel circuit is the same as operation in the analog display mode. Therefore, description of the operation is omitted.

Figure 11:
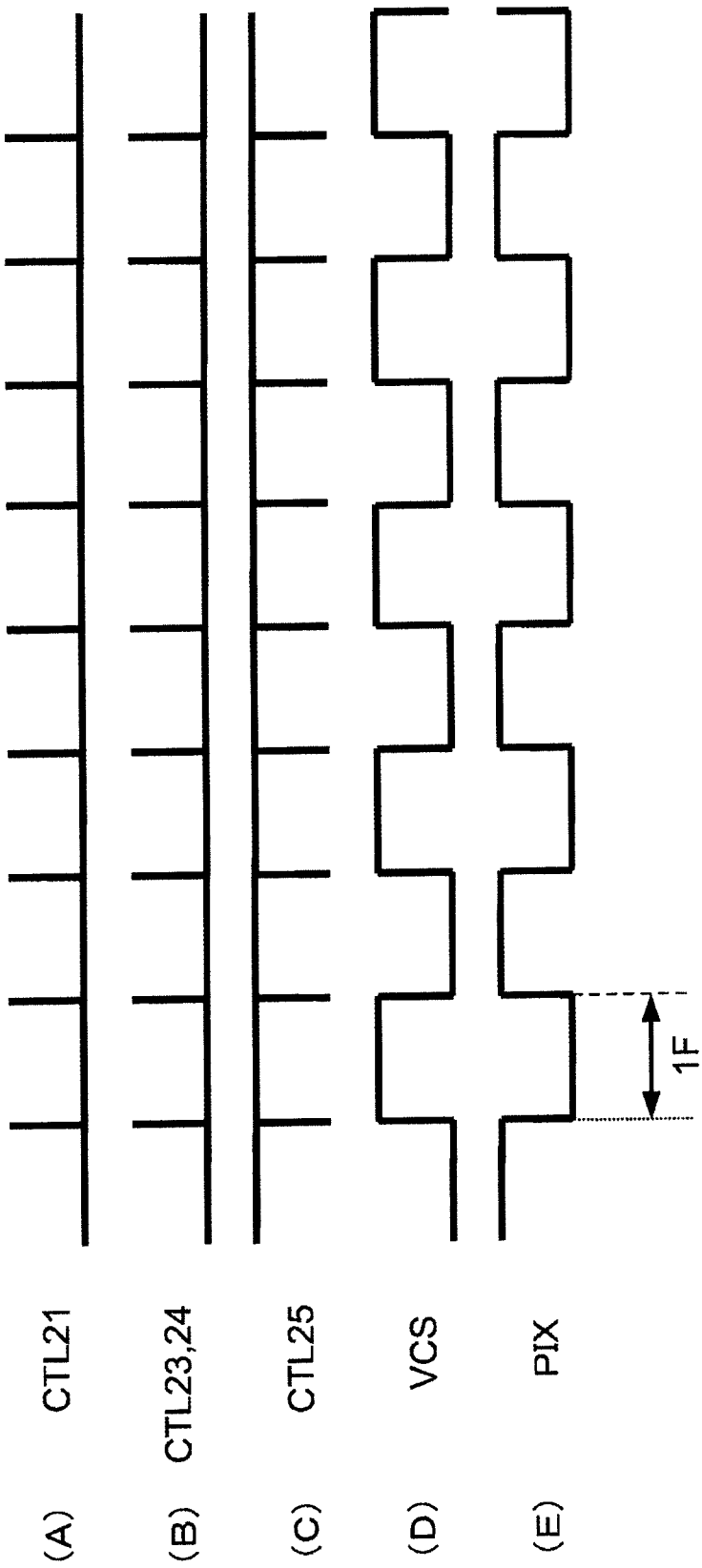
FIG. 11 is a diagram showing a general drive operation example in a memory display mode.

FIG. 11 shows a content of control operation of the control line drive section 37 in the case of refreshing gray-scale potential stored in the holding capacitance Cs within a sub pixel. FIG. 11 shows a relationship in drive operation in frames.

In FIG. 11, (A) shows a drive waveform of the control line CTL21. (B) shows a drive waveform of each of the control lines CTL23 and CTL24. The two control lines are applied with high-level potential in a pulsed manner on a one-frame cycle. (C) shows a drive waveform of the control line CTL25. The control line CTL25 is applied with low-level potential in a pulsed manner on a one-frame cycle.

In FIG. 11, (D) shows a drive waveform of counter electrode potential VCS. As shown in the figure, high-level potential and low-level potential are alternately outputted on a one-frame cycle.

(E) shows a waveform of showing change in gray-scale potential (PIX) to be written to the holding capacitance Cs. As shown in the figure, the gray-scale potential (PIX) is alternately changed in order to keep a light emitting state of the sub pixel 41 in the memory display mode.

In the memory display mode, the control line CTL22 is continuously controlled at low-level potential.

Next, drive operation within one frame is described in detail.

Figure 12:
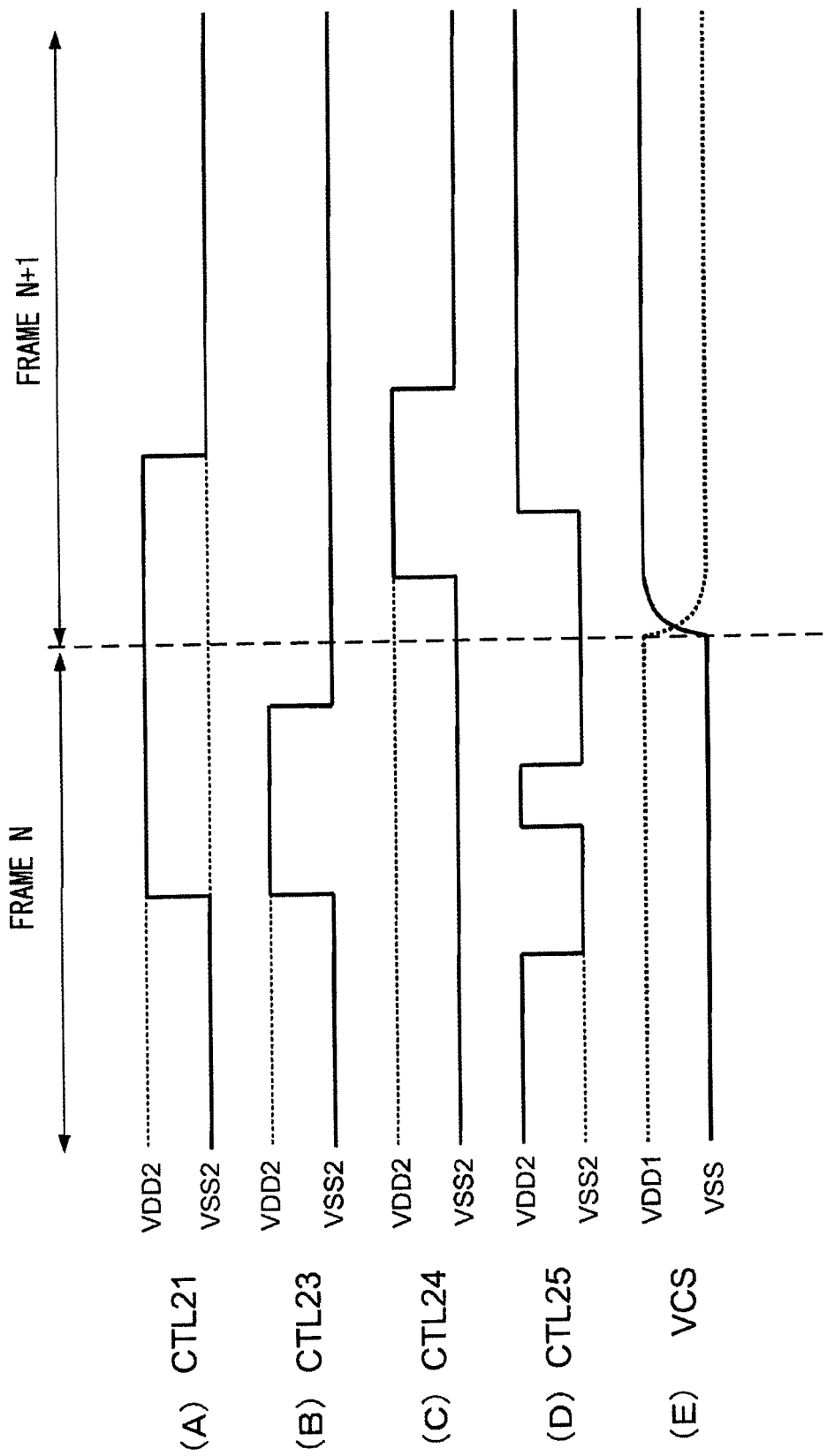
FIG. 12 is a diagram showing a detailed drive operation example in the memory display mode.

FIG. 12 shows a content of control operation of the control line drive section 37 for a certain scan line in the memory display mode. FIG. 12 shows a boundary portion between frames of FIG. 11 in an expanded manner. In FIG. 12, a preceding frame is shown as frame N, and a following frame is shown as frame N+1.

In FIG. 12, (A) shows a drive waveform of the control line CTL21. As shown in the figure, the control line CTL21 is controlled at the high-level potential VDD2 for a certain period from a point immediately before end of the frame N to a point immediately after start of the frame N+1.

(B) shows a drive waveform of the control line CTL23. As shown in the figure, the control line CTL23 is controlled at the high-level potential VDD2 only for a certain period immediately before end of each frame.

(C) shows a drive waveform of the control line CTL24. As shown in the figure, the control line CTL24 is controlled at the high-level potential VDD2 only for a certain period immediately after start of each frame.

(D) shows a drive waveform of the control line CTL25. As shown in the figure, the control line CTL25 is basically controlled at the high-level potential VDD2, but controlled at the low-level potential VSS2 immediately before starting read of gray-scale potential from the holding capacitance Cs to the circuit 1 (FIG. 3).

Then, when certain time has passed, the control line CTL25 is controlled at the high-level potential VDD2 again. Such application of the high-level potential VDD2 is performed for a certain period before the frame N is finished. A latch function of the circuit 1 (FIG. 3) is enabled during applying the high-level potential VDD2, and gray-scale potential (PIX) read from the holding capacitance is returned to original potential. That is, self-refresh operation is performed. In this way, self-refresh operation is performed without charging or discharging the signal line DTL.

When the self-refresh operation is finished, the control line CTL25 is controlled at the low-level potential VSS2 again, and such a potential state is kept until a certain period has passed from start of a following frame. Then, after a certain time has passed from start of ON control of the thin film transistor N14 acting as the third switch SW3, the control line CTL25 is controlled to be ON again, and such a potential state is kept.

In FIG. 12, (E) shows a waveform showing change in counter electrode potential VCS. As shown in the figure, a potential level is inverted with a frame period.

Figure 13:
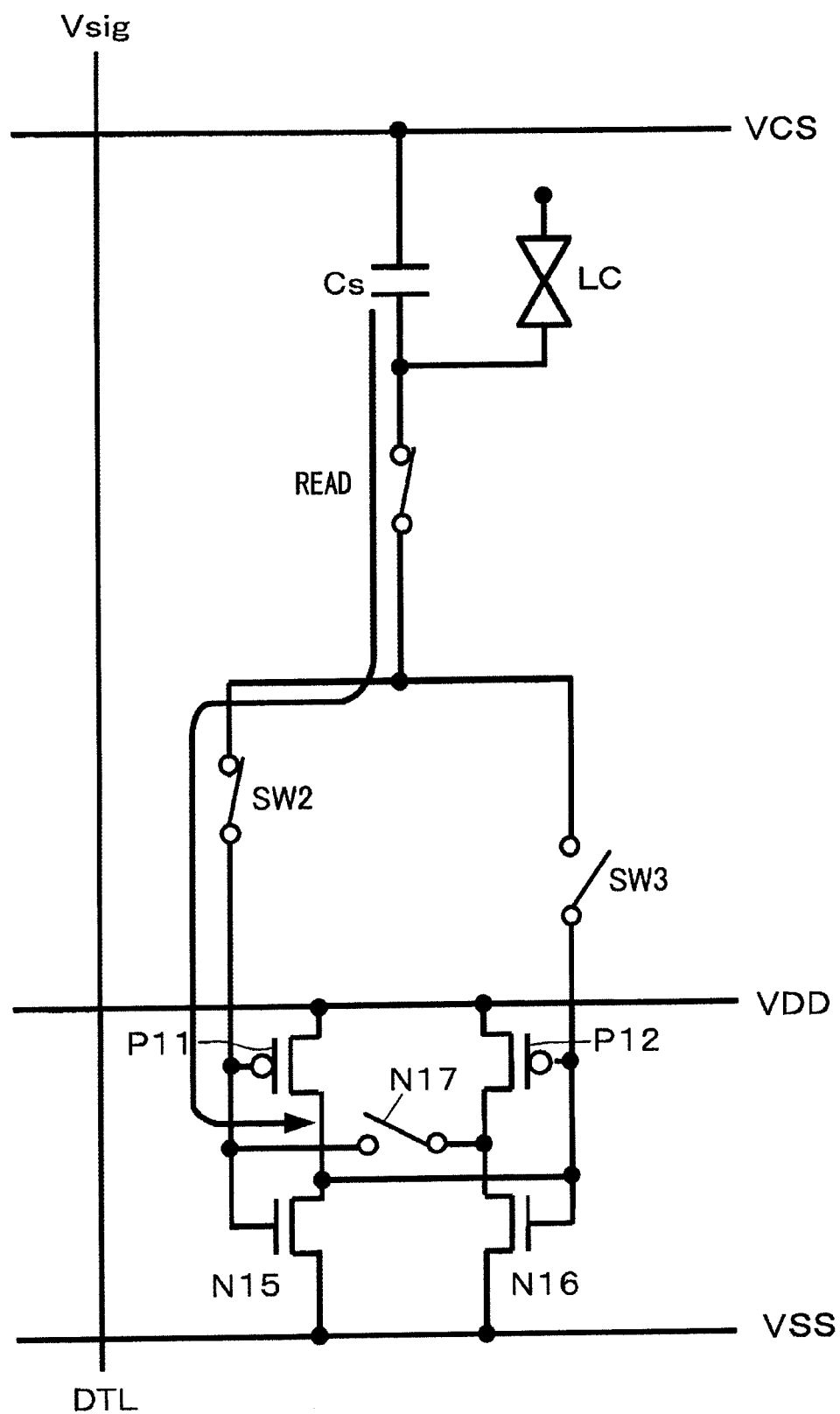
FIG. 13 is a diagram showing a connection condition within a pixel circuit when gray-scale potential is read from a holding capacitance.

FIG. 13 shows a state within the pixel circuit when gray-scale potential (PIX) is read from the holding capacitance Cs in the memory display mode.

At that time, the thin film transistor N11 and the thin film transistor N13 (second switch SW2) are controlled to be ON. Thus, gray-scale potential held by the holding capacitance Cs acting as DRAM is read by the inverter circuit including the thin film transistor P11 and the thin film transistor N15 through an input end of the inverter circuit.

Figure 14:
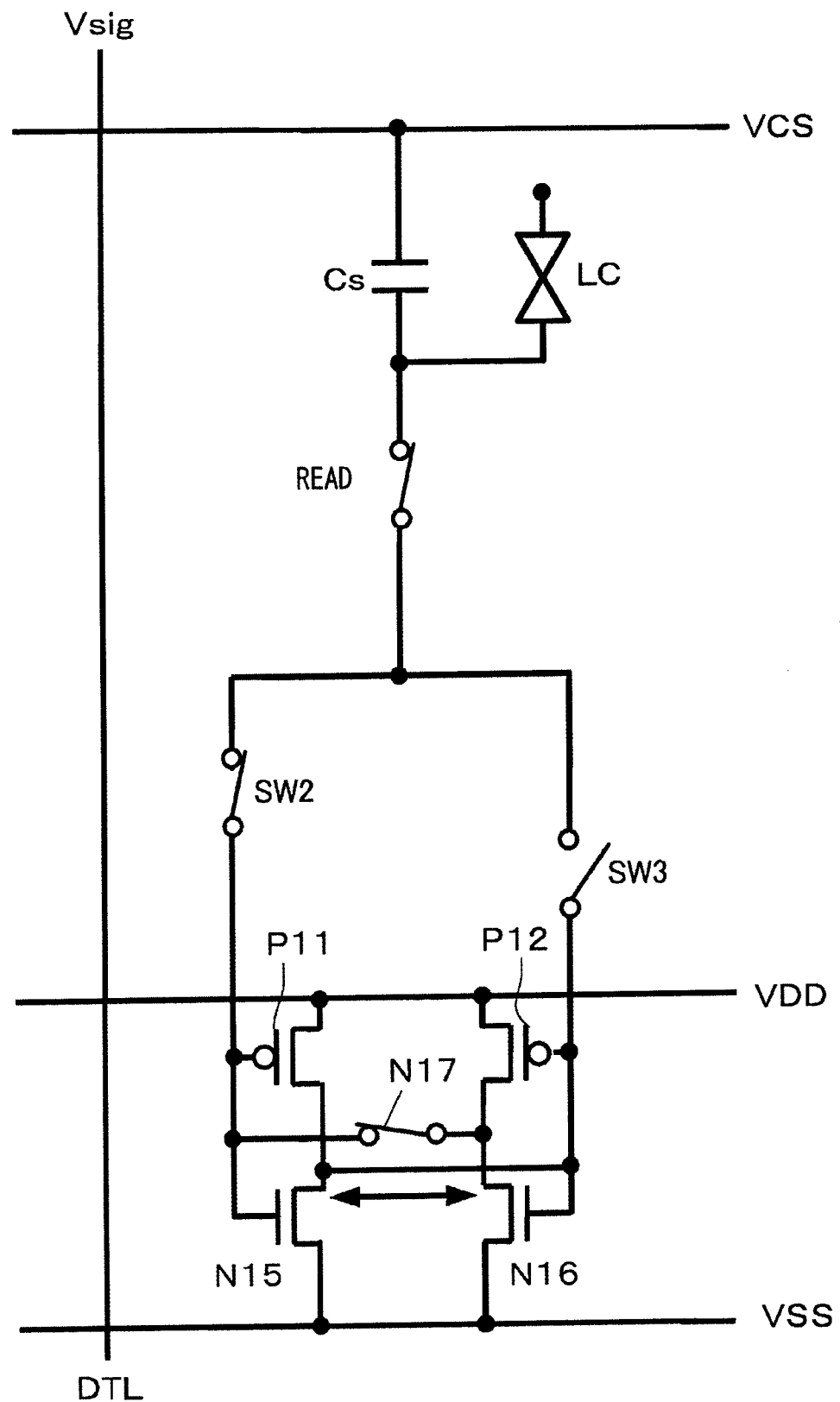
FIG. 14 is a diagram showing a connection condition within a pixel circuit during latch operation.

When the thin film transistor N17 is controlled to be ON in this state, the circuit 1 (FIG. 3) operates as a latch circuit as shown in FIG. 14, and logic amplitude of the gray-scale potential read from the holding capacitance Cs is restored.

Figure 15:
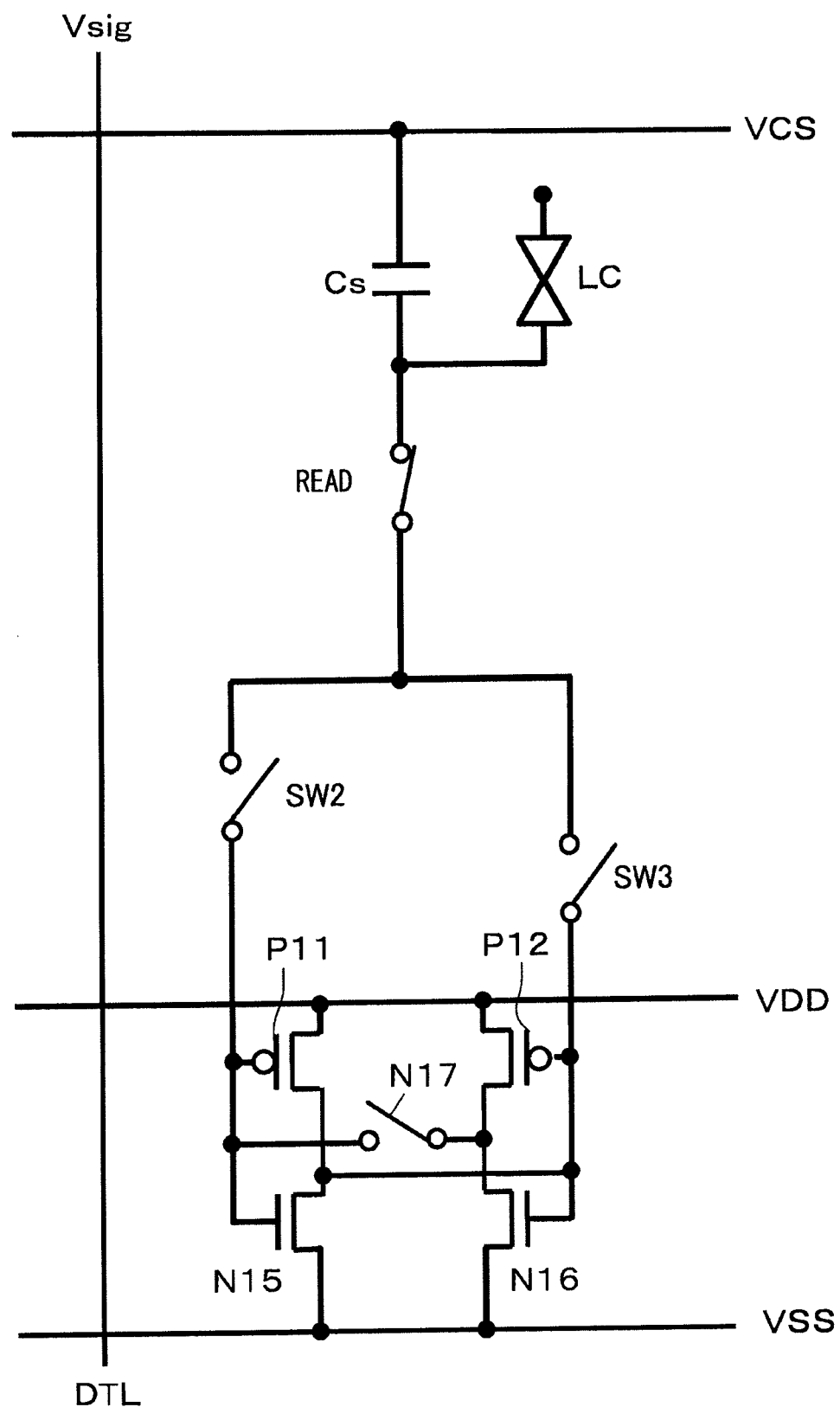
FIG. 15 is a diagram showing a connection condition within a pixel circuit in a transient period.

Then, the thin film transistor N17 is controlled to be OFF, and then the thin film transistor N13 is also controlled to be OFF. This state is a connection state as shown in FIG. 15. Thus, gray-scale potential inverted in logic is provided on an input side of each of the thin film transistors P12 and N16 while restoring logic amplitude of gray-scale potential read from the holding capacitance Cs during a period of the frame N.

Figure 16:
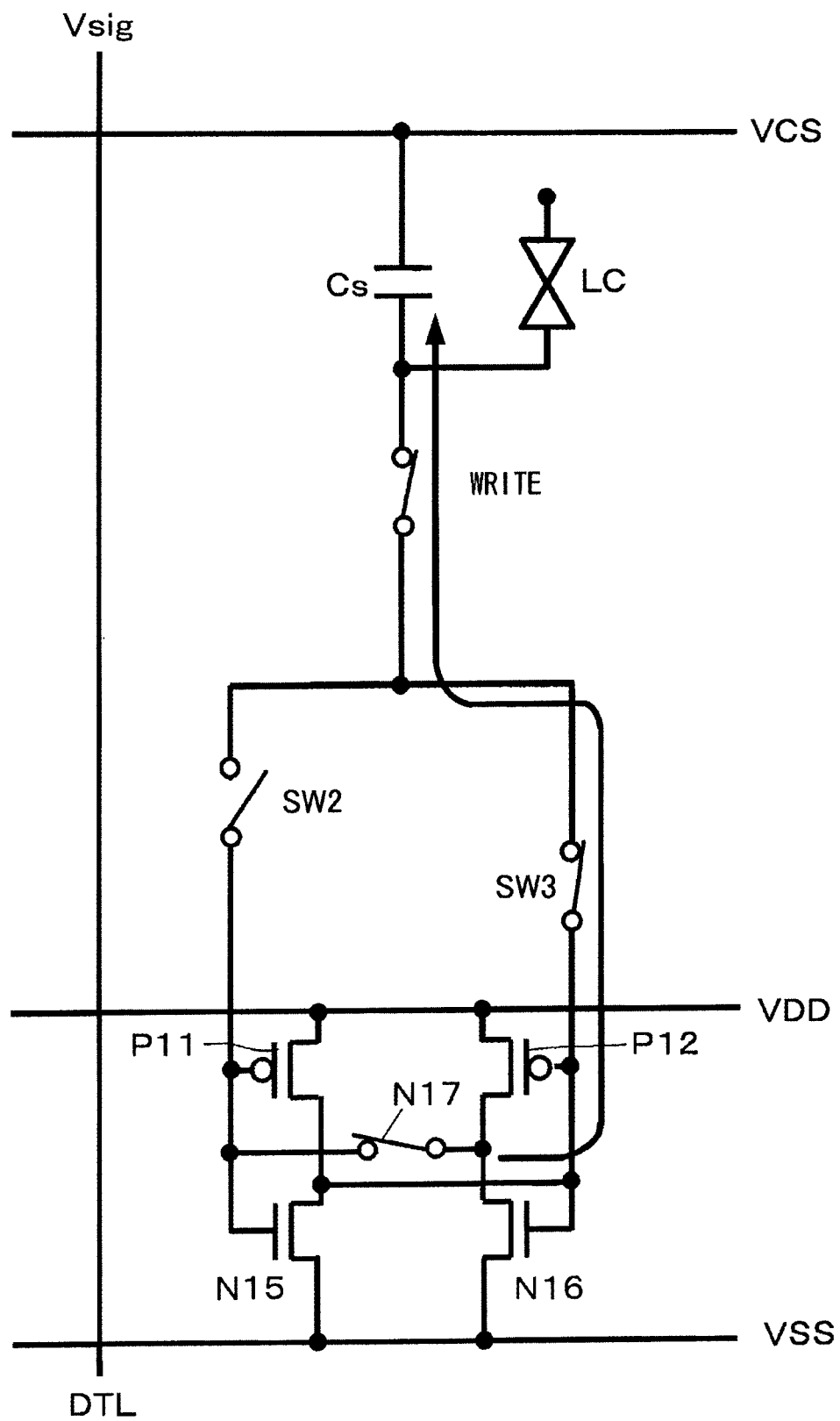
FIG. 16 is a diagram showing a connection condition within a pixel circuit when gray-scale potential inverted in logic is written to the holding capacitance.

Then, the thin film transistor N14 is first controlled to be ON, and then the thin film transistor N17 is controlled to be ON. This state is a connection state as shown in FIG. 16. Thus, gray-scale potential is newly written to the holding capacitance Cs, the gray-scale potential being inverted in logic after gray-scale potential of the frame N is refreshed.

The above operation is repeated during a period of the memory display mode.

(B-4) Conclusion

The pixel structure according to the present embodiment is used, so that a liquid crystal display panel may be achieved, which may meet both the analog display mode and the memory display mode.

In addition, since the holding capacitance Cs is used as DRAM in the memory display mode, capacitance area can be small, and thus an aperture ratio may be designed to be high.

Moreover, in the case of the pixel structure according to the present embodiment, the sub pixel 41 is basically unnecessary to be connected to the signal line DTL in the memory display mode. That is, even if the signal line DTL is not charged or discharged, gray-scale potential of the holding capacitance Cs, which is allowed to act as DRAM, may be refreshed. This enables further reduction in power consumption in the memory display mode.

(C) Second Embodiment

Next, a second embodiment is described. In the present embodiment, description is made on a case where one circuit 1 (FIG. 3) is disposed for three sub pixels 41 configuring a white unit.

(C-1) Configuration of Pixel Circuit

Figure 17:
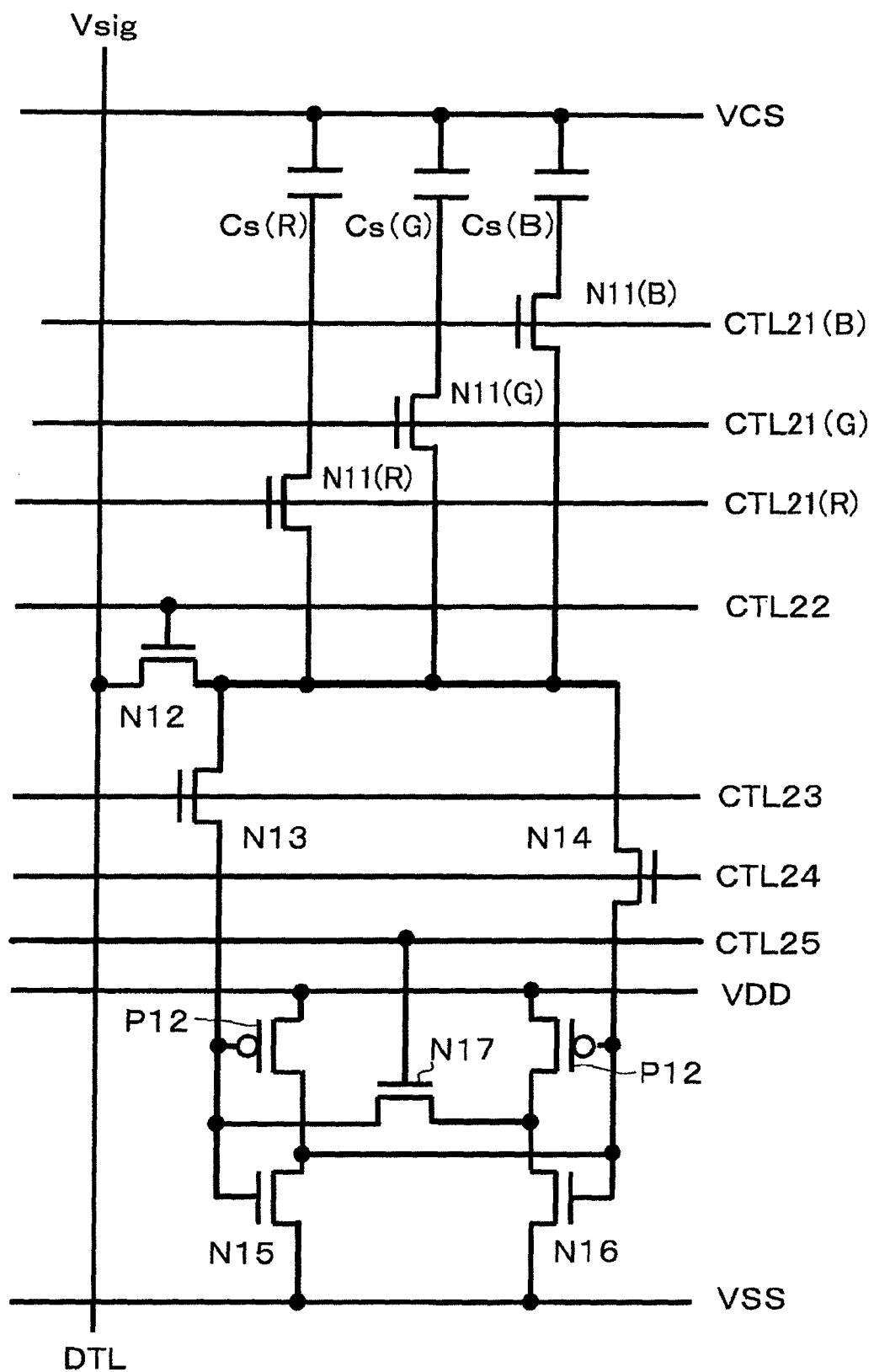
FIG. 17 is a diagram showing a configuration example of a pixel circuit according to a second embodiment.

FIG. 17 shows a configuration example of a pixel circuit corresponding to sub pixels 41 according to the second embodiment. In FIG. 17, portions corresponding to those in FIG. 8 are marked with the same reference numerals or signs. Even in FIG. 17, LC is omitted to be shown for convenience of drawing as in FIG. 2.

FIG. 17 is different from FIG. 8 in that thin film transistors N11 are prepared to the number of three sub pixels 41 configuring a white unit. That is, three thin film transistors N11(B), N11(G) and N11(R) are prepared. "B" in the parenthesis shows a thin film transistor used for a sub pixel corresponding to blue. "G" in the parenthesis shows a thin film transistor used for a sub pixel corresponding to green. "R" in the parenthesis shows a thin film transistor used for a sub pixel corresponding to red.

Therefore, a holding capacitance Cs(B) shows a holding capacitance Cs of the sub pixel 41 corresponding to blue display. Similarly, a holding capacitance Cs(G) shows a holding capacitance Cs of the sub pixel 41 corresponding to green display. Similarly, a holding capacitance Cs(R) shows a holding capacitance Cs of the sub pixel 41 corresponding to red display.

A control line CTL21(B) is used for controlling the thin film transistor N11(B). A control line CTL21(G) is used for controlling the thin film transistor N11(G). A control line CTL21(R) is used for controlling the thin film transistor N11(R).

(C-2) Drive Operation Example

Hereinafter, drive operation examples of the pixel circuit according to the present embodiment are described for each display mode.

(1) Analog Display Mode

Figure 18:
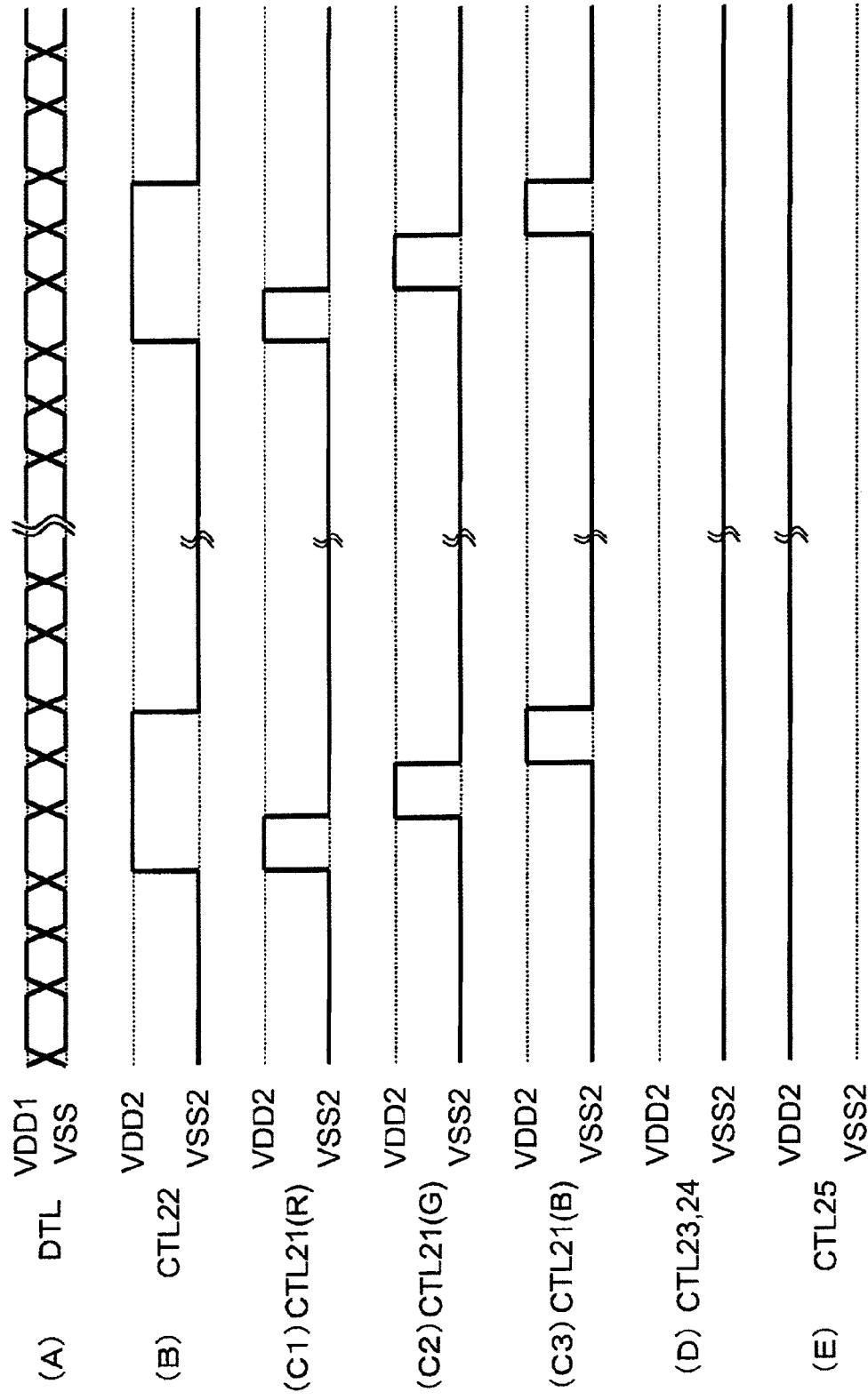
FIG. 18 is a diagram showing a drive operation example in an analog display mode.

FIG. 18 shows a content of control operation of the control line drive section 37 for a certain scan line in the analog display mode. In FIG. 18, (A) shows a waveform of gray-scale potential applied to the signal line DTL. In the present embodiment, polarity of voltage applied between a pixel electrode and a counter electrode is inverted on a horizontal-period cycle (1H cycle). That is, line inversion drive is performed. Therefore, in (A), the waveform of gray-scale potential applied to the signal line DTL is drawn such that a potential level is inverted on a 1H cycle. High-level potential of the gray-scale potential applied to the signal line DTL is VDD1, and low-level potential thereof is VSS. While (A) shows an example of a case of the largest amplitude, a potential level between VDD1 and VSS is actually used depending on pixel gray-scale.

In FIG. 18, (B) shows a drive waveform of the control line CTL22. High-level potential of drive amplitude is VDD2, and low-level potential thereof is VSS2. As shown in the figure, drive potential is controlled to the high-level potential VDD2 only at the timing of writing gray-scale potential from the signal line DTL.

(C1) to (C3) show drive waveforms of the control lines CTL21(R), CTL21(G) and CTL21(B) respectively. As shown in the figure, the control lines CTL21(R), CTL21(G) and CTL21(B) are sequentially controlled at high-level potential VDD2 in order of R, G and B. Periods where the respective control lines CTL21(R), CTL21(G) and CTL21(B) are at the high-level potential VDD2 are set to be not overlapped with one another. During the period where each of the control lines CTL21(R), CTL21(G) and CTL21(B) is at the high-level potential VDD2, corresponding signal potential Vsig is applied to the signal line DTL. High-level potential of drive amplitude is VDD2, and low-level potential thereof is VSS2.

In FIG. 18, (D) shows a drive waveform of each of the control lines CTL23 and CTL24. High-level potential of drive amplitude is VDD2, and low-level potential thereof is VSS2. However, the control lines CTL23 and CTL24 are continuously controlled at the low-level potential VSS2 in the case of the analog display mode.

(E) shows a drive waveform of the control line CTL25. High-level potential of drive amplitude is VDD2, and low-level potential thereof is VSS2. However, the control line CTL25 is continuously controlled at the high-level potential VDD2 in the analog display mode.

(2) Memory Display Mode

The memory display mode includes operation of writing gray-scale potential from the signal line DTL to the holding capacitance Cs, and operation of refreshing gray-scale potential stored in the holding capacitance Cs within a sub pixel. The operation of writing gray-scale potential from the signal line DTL to the holding capacitance Cs is performed, for example, when display contents are changed. When gray-scale potential is written from the signal line DTL to the holding capacitance Cs, the pixel circuit performs the same operation as operation in the analog display mode. Therefore, description of the operation is omitted.

Figure 19:
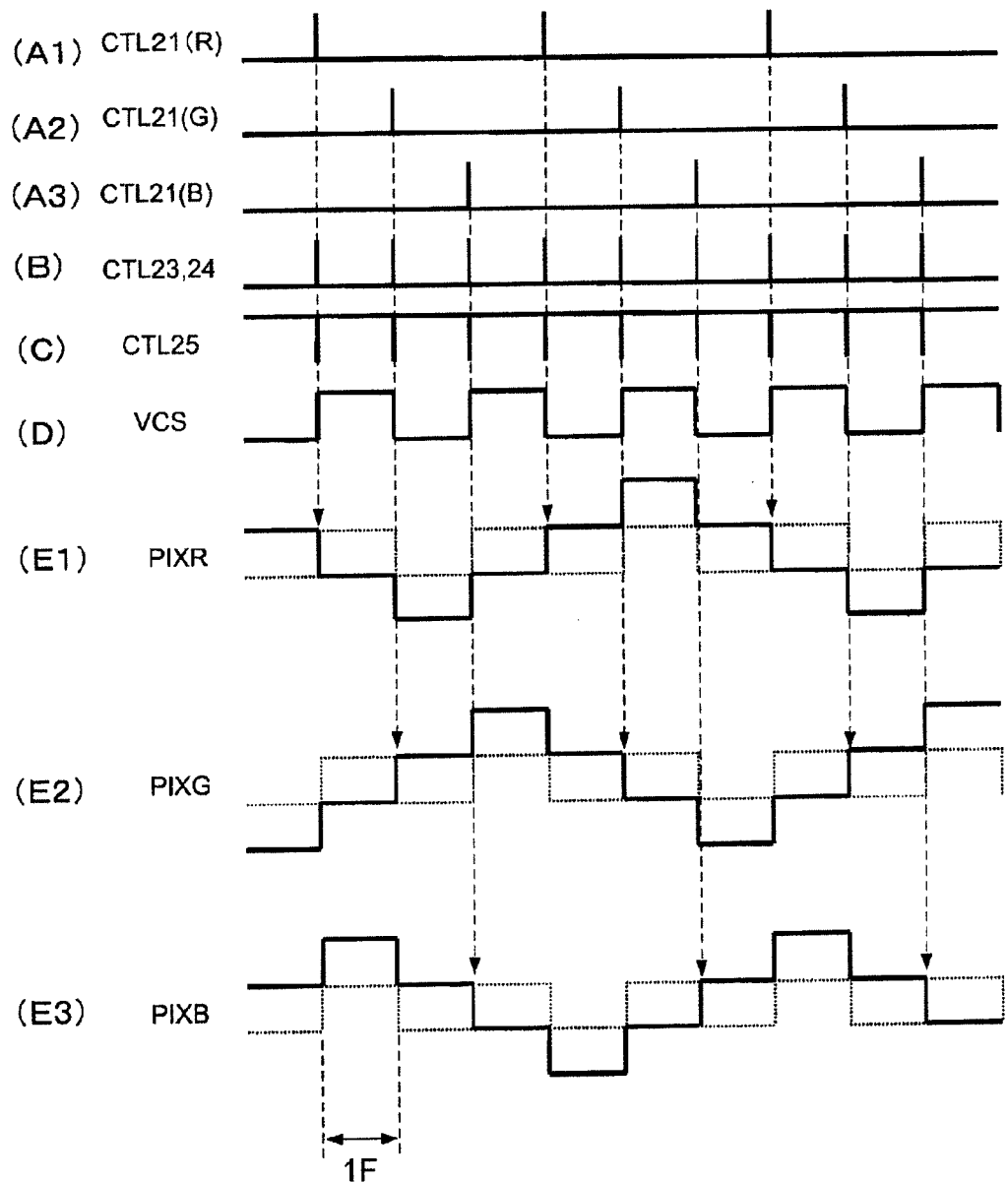
FIG. 19 is a diagram showing a general drive operation example in a memory display mode.

FIG. 19 shows a content of control operation of the control line drive section 37 in the case of refreshing gray-scale potential stored in the holding capacitance Cs within a sub pixel. FIG. 19 shows a relationship in drive operation in frames.

In FIG. 19, (A1) to (A3) show drive waveforms of the control lines CTL21(R), CTL21(G) and CTL21(B) respectively. In the present embodiment, the control lines CTL21(R), CTL21(G) and CTL21(B) are applied with high-level potential in a pulsed manner on a three-frame cycle.

In FIG. 19, (B) shows a drive waveform of each of the control lines CTL23 and CTL24. The two control lines are applied with high-level potential in a pulsed manner on a one-frame cycle. (C) shows a drive waveform of the control line CTL25. The control line CTL25 is applied with low-level potential in a pulsed manner on a one-frame cycle.

In FIG. 19, (D) shows a drive waveform of counter electrode potential VCS. As shown in the figure, high-level potential and low-level potential are alternately outputted on a one-frame cycle.

(E1) to (E3) show waveforms showing change in gray-scale potential (PIXR, PIXG and PIXB) to be written to the holding capacitance Cs respectively. In the figure, a waveform shown by a broken line is a drive waveform of counter electrode potential VCS. A waveform shown by a solid line is a waveform of gray-scale potential stored in each sub pixel 41.

As shown in the figure, gray-scale potential is changed with change in counter electrode potential, and a potential relationship between the counter electrode potential VCS and the gray-scale potential (PIXR, PIXG and PIXB) held by the holding capacitance Cs is changed on a three-frame cycle. That is, self-refresh/self-inverting operation for each color is performed on a three-frame cycle. Note that a potential relationship within the sub pixel 41 is kept from preceding self-refresh/self-inverting operation to following self-refresh/self-inverting operation. Therefore, in the present embodiment, the holding capacitance Cs has sufficient capacitance to keep certain gray-scale potential even if a refresh rate is a three-frame cycle. In the memory display mode, the control line CTL22 is continuously controlled at low-level potential.

Next, drive operation within one frame is described in detail.

Figure 20:
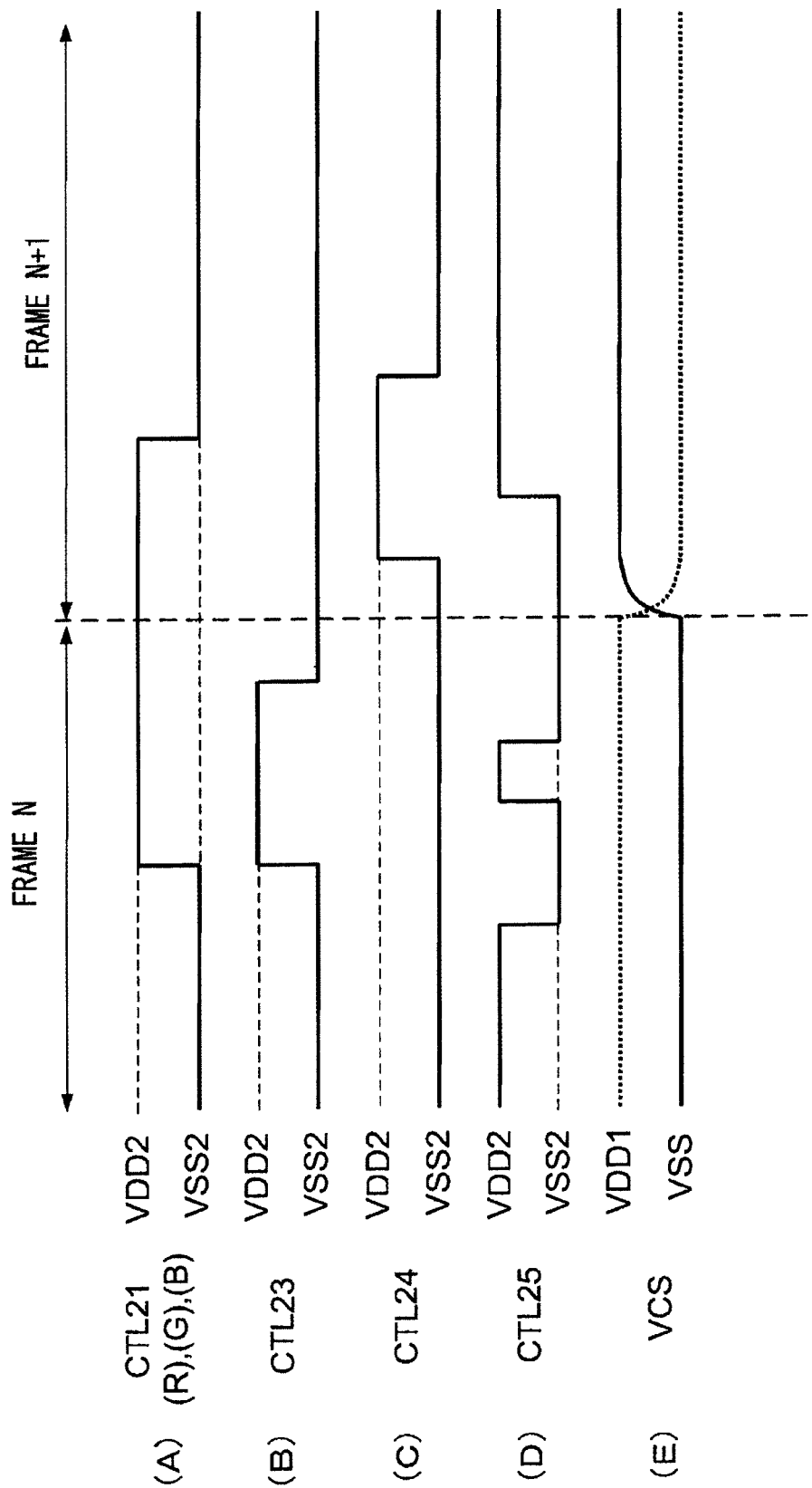
FIG. 20 is a diagram showing a detailed drive operation example in the memory display mode.

FIG. 20 shows a content of control operation of the control line drive section 37 for a certain scan line in the memory display mode. FIG. 20 shows a boundary portion between frames of FIG. 19 in an expanded manner. In FIG. 20, a preceding frame is shown as frame N, and a following frame is shown as frame N+1.

In FIG. 20, (A) shows a drive waveform of each of the control lines CTL21(R), CTL21(G) and CTL21(B). That is, (A) shows operation at a time point of each pulse output in (A1) to (A3) of FIG. 19. Hereinafter, description is made on the control line CTL21(R).

As shown in the figure, the control line CTL21(R) is controlled at the high-level potential VDD2 for a certain period from a point immediately before end of the frame N to a point immediately after start of the frame N+1.

(B) shows a drive waveform of the control line CTL23. As shown in the figure, the control line CTL23 is controlled at the high-level potential VDD2 only for a certain period immediately before end of each frame.

(C) shows a drive waveform of the control line CTL24. As shown in the figure, the control line CTL24 is controlled at the high-level potential VDD2 only for a certain period immediately after start of each frame.

(D) shows a drive waveform of the control line CTL25. As shown in the figure, the control line CTL25 is basically controlled at the high-level potential VDD2, but controlled at the low-level potential VSS2 immediately before starting read of gray-scale potential from the holding capacitance Cs to the circuit 1 (FIG. 3).

Then, when certain time has passed, the control line CTL25 is controlled at the high-level potential VDD2 again. Such application of the high-level potential VDD2 is performed for a certain period before the frame N is finished. A latch function of the circuit 1 (FIG. 3) is enabled during applying the high-level potential VDD2, and gray-scale potential (PIX) read from the holding capacitance is returned to original potential. That is, self-refresh operation is performed. In this way, self-refresh operation is performed without charging or discharging the signal line DTL.

When the self-refresh operation is finished, the control line CTL25 is controlled at the low-level potential VSS2 again, and such a potential state is kept until a certain period has passed from start of a following frame. Then, after a certain time has passed from start of ON control of the thin film transistor N14 acting as the third switch SW3, the control line CTL25 is controlled to be ON again, and such a potential state is kept.

In FIG. 20, (E) shows a waveform showing change in counter electrode potential VCS. As shown in the figure, a potential level is inverted with a frame period.

The above operation is sequentially performed in frames for the sub pixel 41 corresponding to red display, the sub pixel 41 corresponding to green display, and the sub pixel 41 corresponding to blue display.

(C-3) Conclusion

Even in the present embodiment, the liquid crystal display panel, which may meet both the analog display mode and the memory display mode, may be achieved.

In addition, in the present embodiment, a single circuit 1 (FIG. 3) may be sequentially used for three sub pixels 41. That is, the number of circuits 1 (FIG. 3) formed within one white unit may be decreased from three to one. As a result, the number of elements configuring a white unit within a pixel area may be reduced. Also, when the number of elements configuring a liquid crystal display panel is reduced, a yield may be correspondingly improved.

(D) Third Embodiment

Next, a third embodiment is described. In the present embodiment, description is made on a case where one circuit 1 (FIG. 3) is disposed for six sub pixels 41 configuring two white units.

(D-1) Configuration of Pixel Circuit

Figure 21:
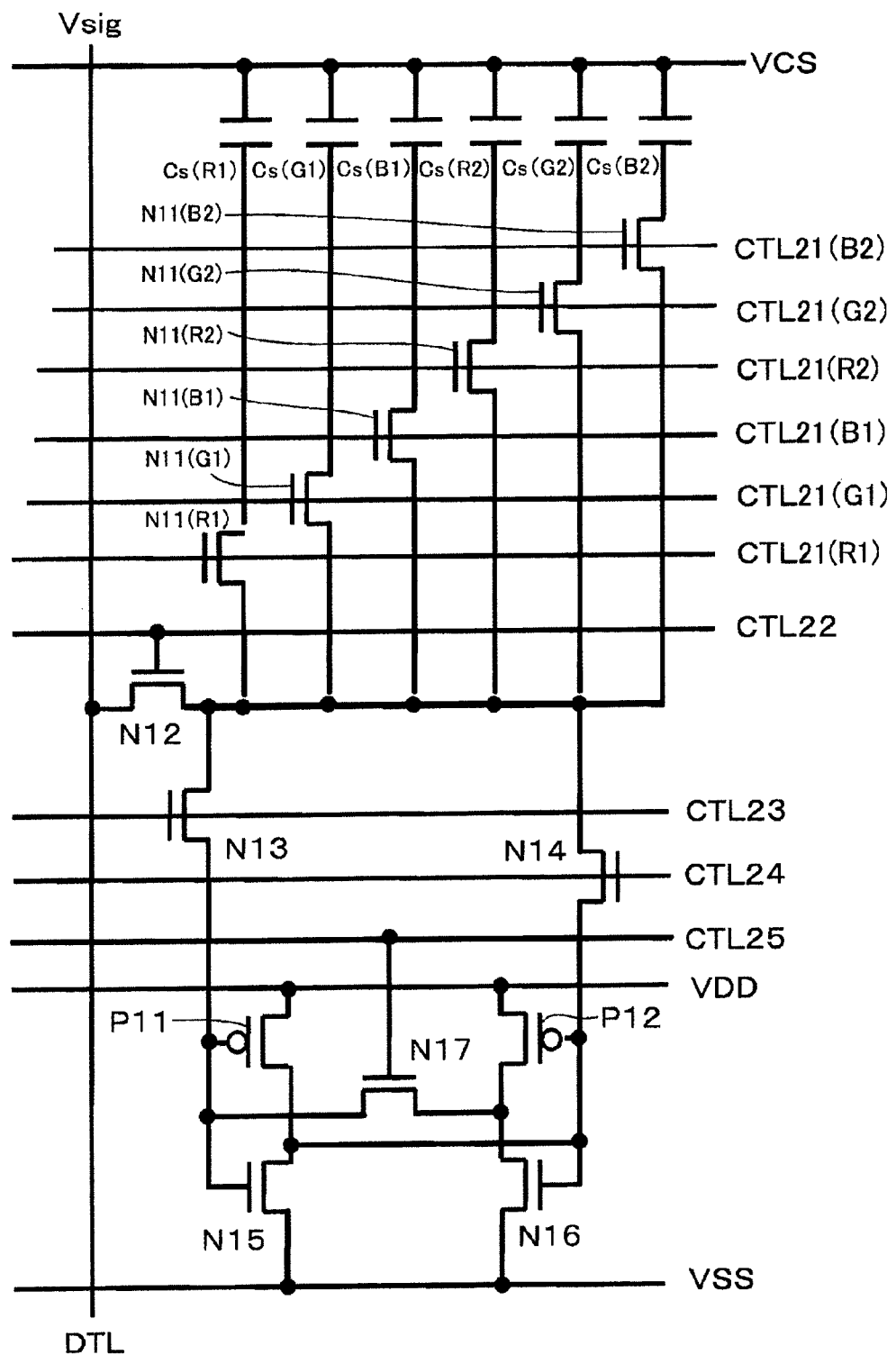
FIG. 21 is a diagram showing a configuration example of a pixel circuit according to a third embodiment.

FIG. 21 shows a configuration example of a pixel circuit corresponding to the sub pixels 41 according to the third embodiment. In FIG. 21, portions corresponding to those in FIG. 17 are marked with the same reference numerals or signs. Even in FIG. 21, LC is omitted to be shown for convenience of drawing as in the case of FIG. 2 or 17.

Figure 1:
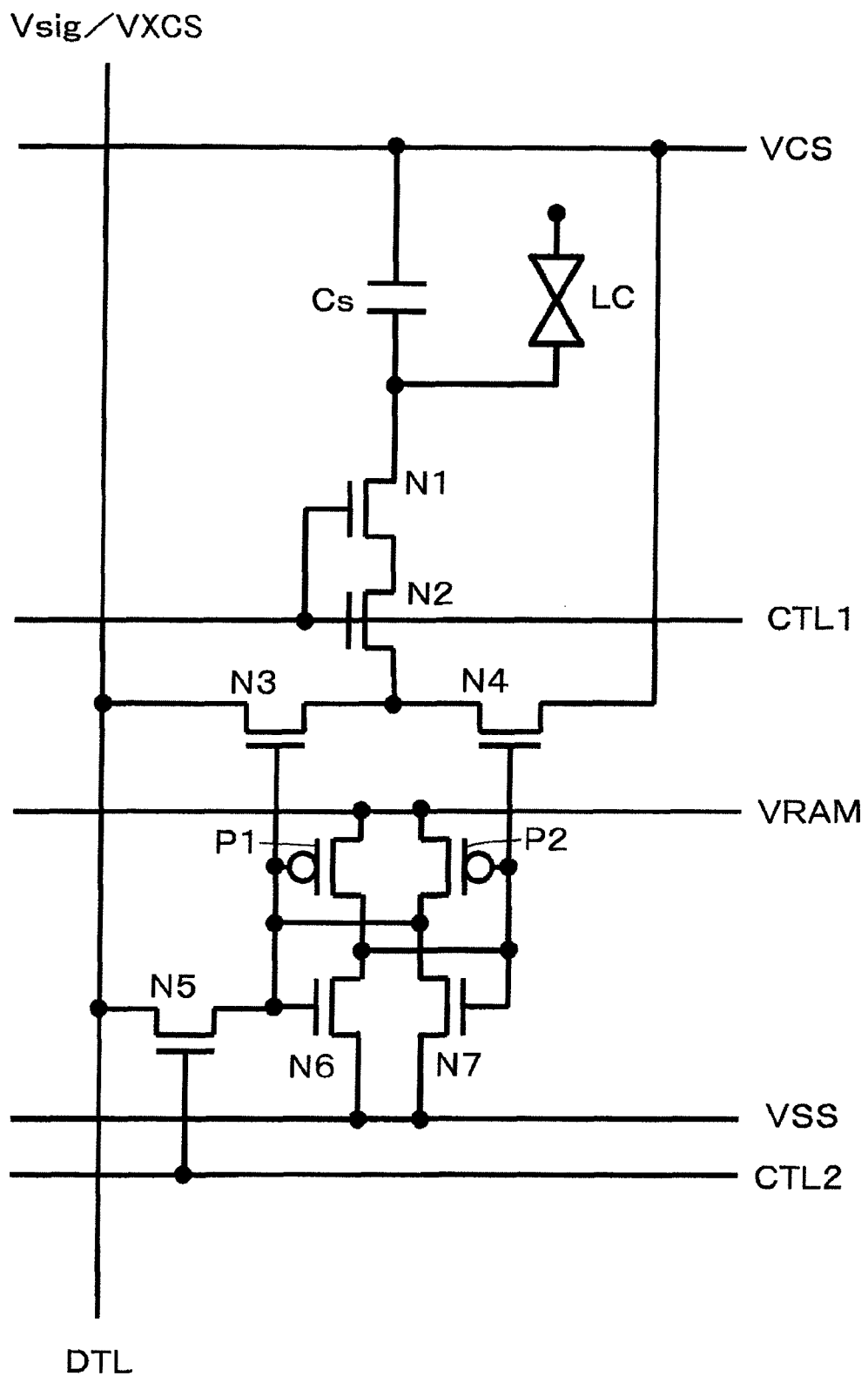
FIG. 1 is a diagram showing a pixel structure example of a liquid crystal display panel.
Figure 2:
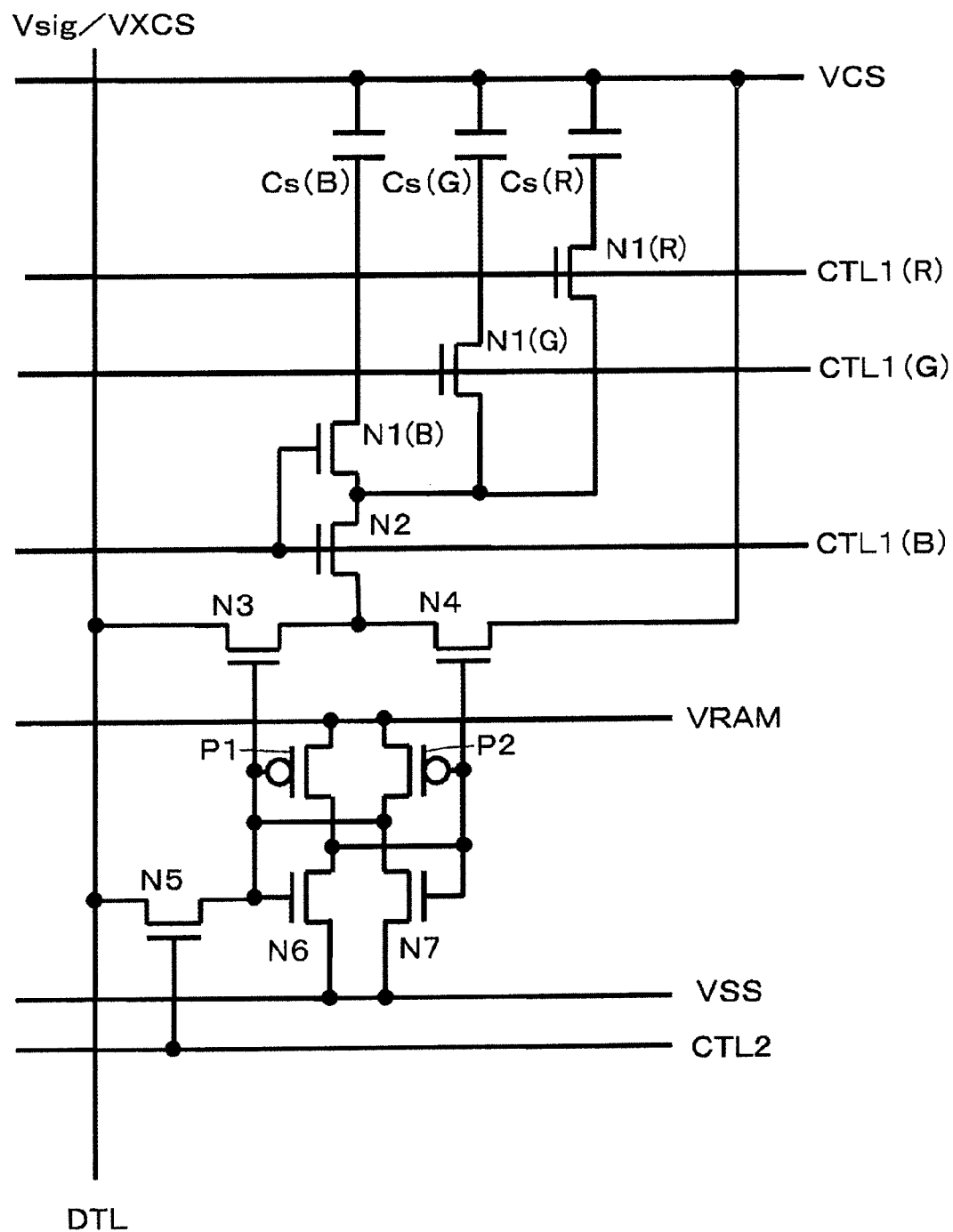
FIG. 2 is a diagram showing a pixel structure example of a liquid crystal display panel.

FIG. 21 is different from FIGS. 2 and 17 in that thin film transistors N11 are prepared to the number of six sub pixels 41 configuring two white units. That is, six thin film transistors N11(B1), N11(G1), N11(R1), N11(B2), N11(G2) and N11(R2) are prepared.

Even in FIG. 21, "B" in the parenthesis shows a thin film transistor used for a sub pixel corresponding to blue. "G" in the parenthesis shows a thin film transistor used for a sub pixel corresponding to green. "R" in the parenthesis shows a thin film transistor used for a sub pixel corresponding to red.

"1" in the parenthesis shows a thin film transistor used for a sub pixel configuring a first white unit, and "2" in the parenthesis shows a thin film transistor used for a sub pixel configuring a second white unit.

Therefore, a holding capacitance Cs(B1) shows a holding capacitance Cs of the sub pixel 41 corresponding to blue display configuring the first white unit. Similarly, a holding capacitance Cs(G1) shows a holding capacitance Cs of the sub pixel 41 corresponding to green display configuring the first white unit. Similarly, a holding capacitance Cs(R1) shows a holding capacitance Cs of the sub pixel 41 corresponding to red display configuring the first white unit.

A holding capacitance Cs(B2) shows a holding capacitance Cs of the sub pixel 41 corresponding to blue display configuring the second white unit. Similarly, a holding capacitance Cs(G2) shows a holding capacitance Cs of the sub pixel 41 corresponding to green display configuring the second white unit. Similarly, a holding capacitance Cs(R2) shows a holding capacitance Cs of the sub pixel 41 corresponding to red display configuring the second white unit.

A control line CTL21(B1) is used for controlling the thin film transistor N11(B1). A control line CTL21(G1) is used for controlling the thin film transistor N11(G1). A control line CTL21(R1) is used for controlling the thin film transistor N11(R1).

A control line CTL21(B2) is used for controlling the thin film transistor N11(B2). A control line CTL21(G2) is used for controlling the thin film transistor N11(G2). A control line CTL21(R2) is used for controlling the thin film transistor N11(R2).

(D-2) Drive Operation Example

Figure 22:
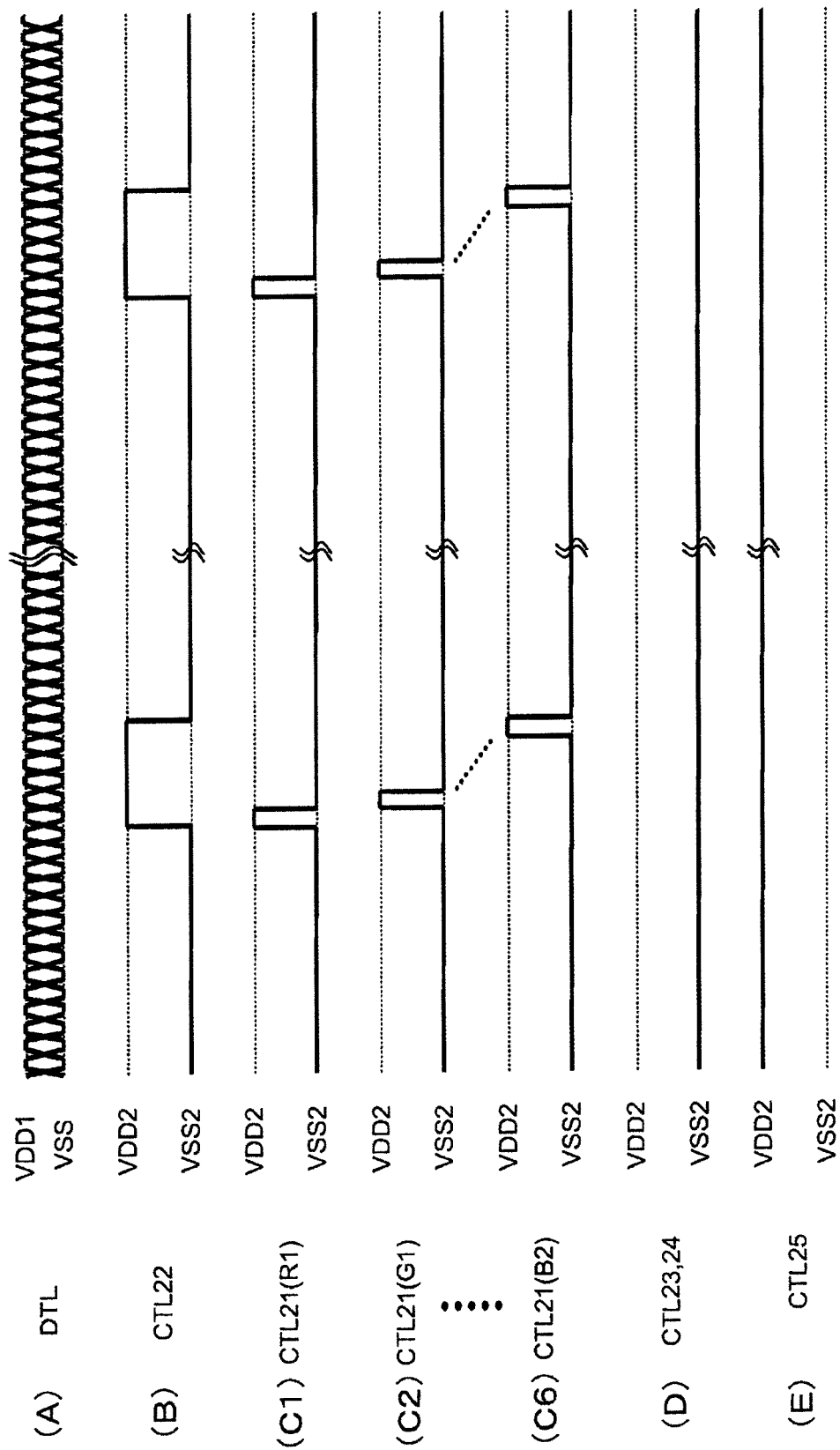
FIG. 22 is a diagram showing a drive operation example in an analog display mode.

Hereinafter, drive operation examples of the pixel circuit according to the present embodiment are described for each display mode.
(1) Analog Display Mode FIG. 22 shows a content of control operation of the control line drive section 37 for a certain scan line in the analog display mode. In FIG. 22, (A) shows a waveform of gray-scale potential applied to the signal line DTL. Even in the present embodiment, polarity of voltage applied between a pixel electrode and a counter electrode is inverted on one horizontal-period cycle (1H cycle). That is, line inversion drive is performed. Therefore, in (A), the waveform of gray-scale potential applied to the signal line DTL is drawn such that a potential level is inverted on a 1H cycle. High-level potential of the gray-scale potential applied to the signal line DTL is VDD1, and low-level potential thereof is VSS. While (A) shows an example of a case of the largest amplitude, a potential level between VDD1 and VSS is actually used depending on pixel gray-scale.

In FIG. 22, (B) shows a drive waveform of the control line CTL22. High-level potential of drive amplitude is VDD2, and low-level potential thereof is VSS2. As shown in the figure, drive potential is controlled to the high-level potential VDD2 only at the timing of writing gray-scale potential from the signal line DTL.

(C1) to (C6) show drive waveforms of the control lines CTL21(R1), CTL21(G1), CTL21(B1), CTL21(R2), CTL21(G2) and CTL21(B2) respectively. The control lines CTL21(B1), CTL21(R2) and CTL21(G2) are omitted to be shown.

As shown in the figure, the control lines CTL21(R1), CTL21(G1), CTL21(B1), CTL21(R2), CTL21(G2) and CTL21(B2) are sequentially controlled at high-level potential VDD2 in order of R1, G1, B1, R2, G2 and B2. Periods where the respective control lines CTL21(R1), CTL21(G1), CTL21(B1), CTL21(R2), CTL21(G2) and CTL21(B2) are at the high-level potential VDD2 are set to be not overlapped with one another. During the period where each of the control lines CTL21(R1), CTL21(G1), CTL21(B1), CTL21(R2), CTL21(G2) and CTL21(B2) is at the high-level potential VDD2, corresponding signal potential Vsig is applied to the signal line DTL. High-level potential of drive amplitude is VDD2, and low-level potential thereof is VSS2.

In FIG. 22, (D) shows a drive waveform of each of the control lines CTL23 and CTL24. High-level potential of drive amplitude is VDD2, and low-level potential thereof is VSS2. However, the control lines CTL23 and CTL24 are continuously controlled at the low-level potential VSS2 in the analog display mode.

(E) shows a drive waveform of the control line CTL25. High-level potential of drive amplitude is VDD2, and low-level potential thereof is VSS2. However, the control line CTL25 is continuously controlled at the high-level potential VDD2 in the analog display mode.
(2) Memory Display Mode The memory display mode includes operation of writing gray-scale potential from the signal line DTL to the holding capacitance Cs, and operation of refreshing gray-scale potential stored in the holding capacitance Cs within a sub pixel. The operation of writing gray-scale potential from the signal line DTL to the holding capacitance Cs is performed, for example, when display contents are changed. When gray-scale potential is written from the signal line DTL to the holding capacitance Cs, the pixel circuit performs the same operation as operation in the analog display mode. Therefore, description of the operation is omitted.

Figure 23:
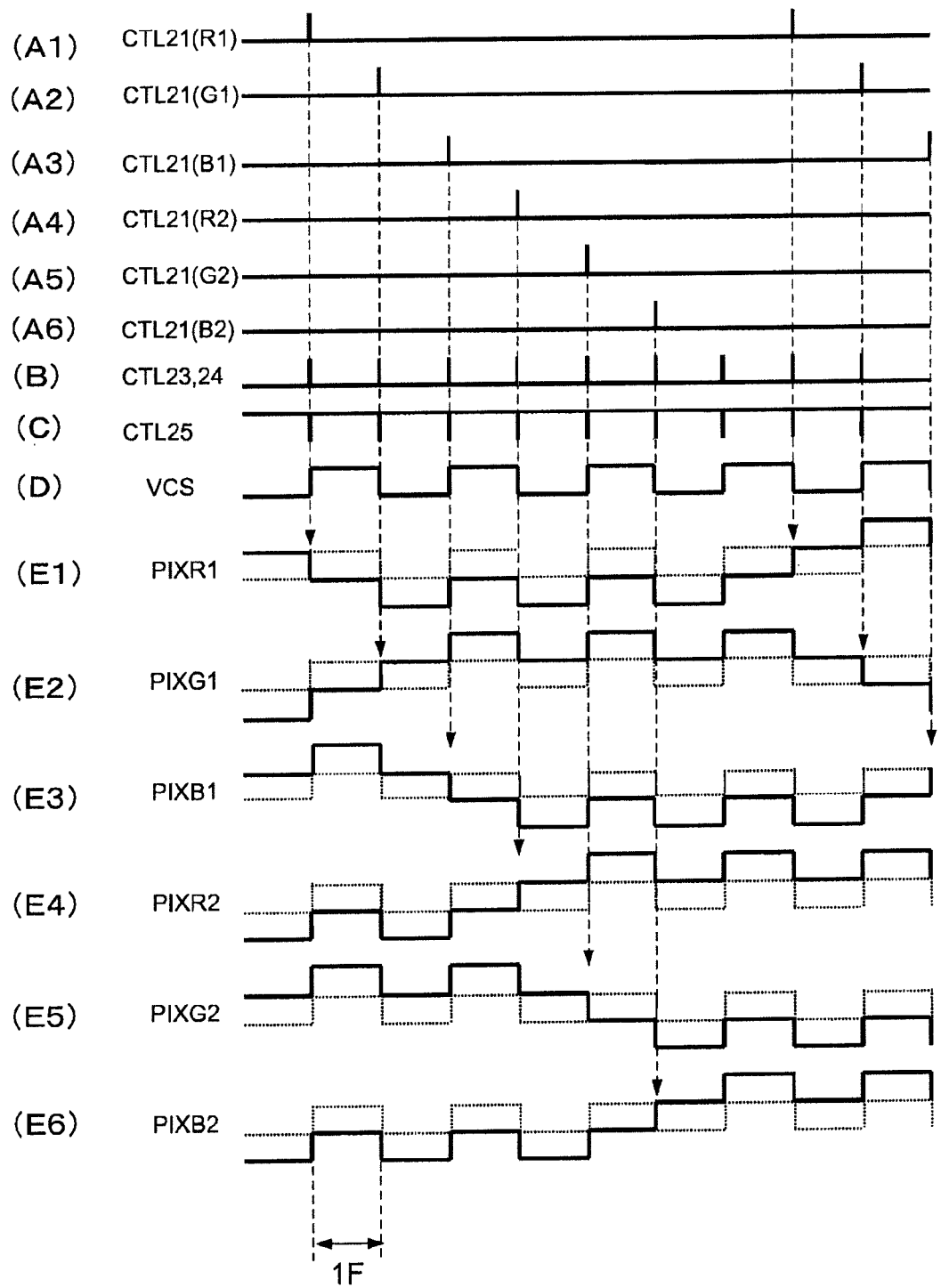
FIG. 23 is a diagram showing a general drive operation example in a memory display mode.

FIG. 23 shows a content of control operation of the control line drive section 37 in the case of refreshing gray-scale potential stored in the holding capacitance Cs within a sub pixel. FIG. 23 shows a relationship in drive operation in frames.

In FIG. 23, (A1) to (A6) show drive waveforms of the control lines CTL21(R1), CTL21(G1), CTL21(B1), CTL21(R2), CTL21(G2) and CTL21(B2) respectively. In the present embodiment, the control lines CTL21(R1), CTL21(G1), CTL21(B1), CTL21(R2), CTL21(G2) and CTL21(B2) are applied with high-level potential in a pulsed manner on a six-frame cycle.

In FIG. 23, (B) shows a drive waveform of each of the control lines CTL23 and CTL24. The two control lines are applied with high-level potential in a pulsed manner on a one-frame cycle. (C) shows a drive waveform of the control line CTL25. The control line CTL25 is applied with low-level potential in a pulsed manner on a one-frame cycle.

In FIG. 23, (D) shows a drive waveform of counter electrode potential VCS. As shown in the figure, high-level potential and low-level potential are alternately outputted on a one-frame cycle.

(E1) to (E6) show waveforms showing change in gray-scale potential (PIXR1, PIXG1, PIXB1, PIXR2, PIXG2 and PIXB2) to be written to the holding capacitance Cs respectively. In the figure, a waveform shown by a broken line is a drive waveform of counter electrode potential VCS. A waveform shown by a solid line is a waveform of gray-scale potential stored in each sub pixel 41.

As shown in the figure, gray-scale potential is changed with change in counter electrode potential, and a potential relationship between the counter electrode potential VCS and the gray-scale potential (PIXR1, PIXG1, PIXB1, PIXR2, PIXG2 and PIXB2) held by the holding capacitance Cs is changed on a six-frame cycle. That is, self-refresh/self-inverting operation for each color is performed on a six-frame cycle. Note that a potential relationship within the sub pixel 41 is kept from preceding self-refresh/self-inverting operation to following self-refresh/self-inverting operation. Therefore, in the present embodiment, the holding capacitance Cs has sufficient capacitance to keep certain gray-scale potential even if a refresh rate is a six-frame cycle. In the memory display mode, the control line CTL22 is continuously controlled at low-level potential.

Even in this case, detailed drive operation within one frame is the same as that in each of the described, two embodiments. Specifically, drive operation similar to drive operation of FIG. 20 is performed. The drive operation is different from that of FIG. 20 only in that drive waveforms similar to those of A of FIG. 20 correspond to the control lines CTL21(R1), CTL21 (G1), CTL21(B1), CTL21(R2), CTL21(G2) and CTL21 (B2).

(D-3) Conclusion

Even in the present embodiment, the liquid crystal display panel, which may meet both the analog display mode and the memory display mode, may be achieved.

In addition, in the present embodiment, a single circuit 1 (FIG. 3) may be sequentially used for six sub pixels 41. That is, the number of circuits 1 (FIG. 3) formed within two white units may be decreased from six to one. As a result, the number of elements configuring two white units within a pixel area may be further reduced. Also, when the number of elements configuring a liquid crystal display panel is reduced, a yield may be correspondingly improved.

(E) Other Embodiments (E-1) Another Pixel Configuration Example

In the embodiments described above, description has been made on a case where the pixel structure as shown in FIG. 8 is used as a basic configuration. That is, description is made on a case where a thin film transistor N17 was disposed on one of paths connecting input/output ends of two inverter circuits to one another, and latch operation of the circuit 1 was controlled through ON/OFF control of the thin film transistor N17.

Figure 24:
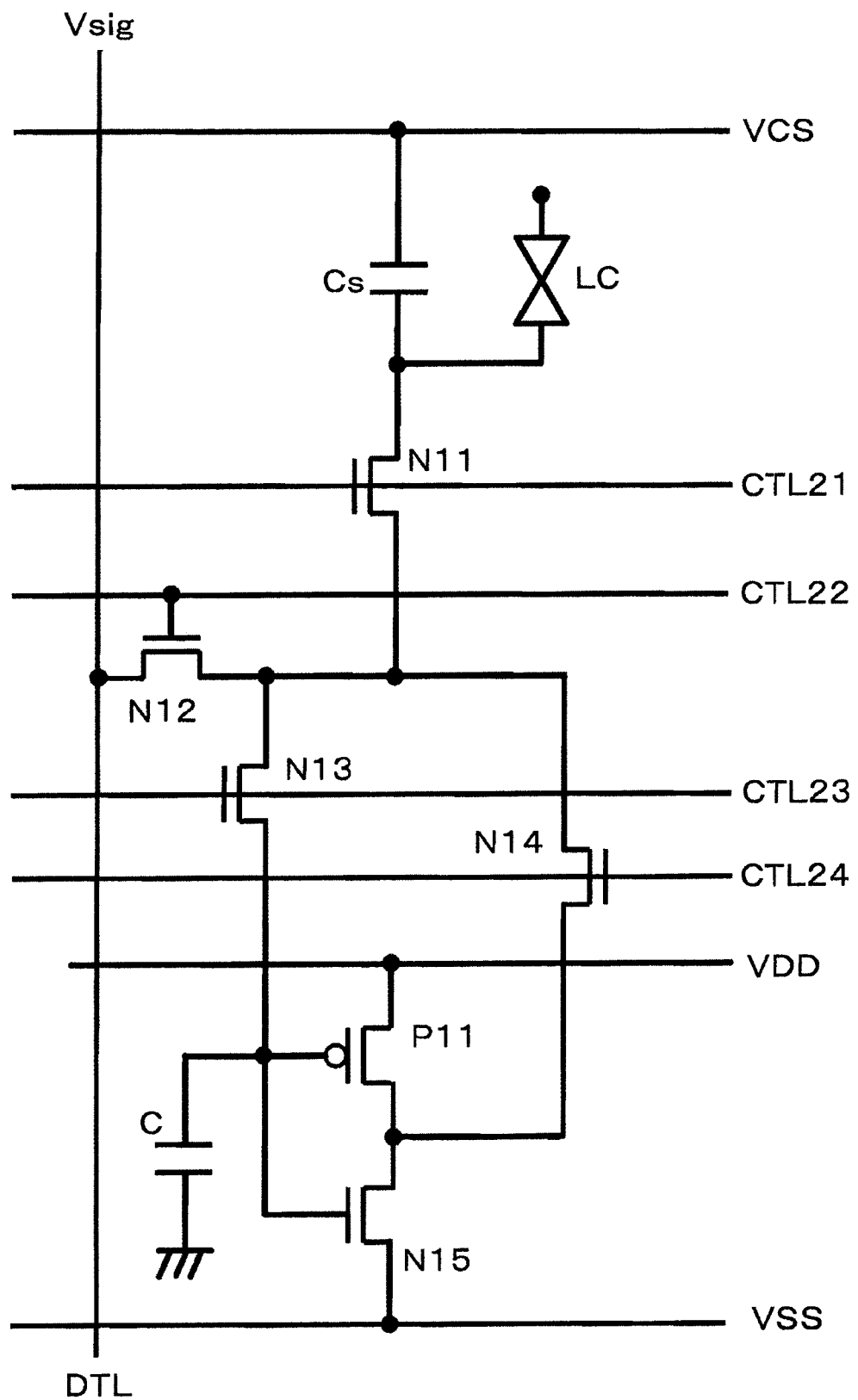
FIG. 24 is a diagram showing another configuration example of a pixel circuit.

However, the drive operation may be achieved even by a pixel circuit shown in FIG. 24.

In FIG. 24, LC shows a liquid crystal corresponding to a sub pixel 41.

In FIG. 24, Cs shows a holding capacitance holding gray-scale potential. In the present embodiment, the holding capacitance Cs is used as DRAM in the memory display mode.

A thin film transistor N11 is an active element that is controlled to be ON during writing gray-scale potential to the holding capacitance Cs, and controlled to be OFF during other periods. A control line CTL21 is used for controlling the thin film transistor N11. One main electrode of the transistor N11 is connected to wiring connected to a pixel electrode, and the other main electrode is connected to one main electrode of a thin film transistor N12 through wiring.

The thin film transistor N12 is an active element that is controlled to be ON when gray-scale potential is written from a signal line DTL. A control line CTL22 is used for controlling the thin film transistor N12. The thin film transistor N12 corresponds to the first switch SW1 in FIG. 3. One main electrode of the transistor N12 is connected to the signal line DTL, and the other main electrode thereof is connected to the one main electrode of the thin film transistor N11 through wiring.

A thin film transistor N13 is an active element that is controlled to be OFF when pixel potential is written from the signal line to the holding capacitance. The transistor N13 is controlled to be ON only for a certain period immediately before end of each frame during performing internal refresh operation of the memory display mode. Gray-scale potential held by the holding capacitance Cs acting as DRAM is read by the circuit 1 (FIG. 3) during a period where the thin film transistor N13 is controlled to be ON. A control line CTL23 is used for controlling the thin film transistor N13. The thin film transistor N13 corresponds to the second switch SW2 in FIG. 3.

A thin film transistor N14 is also an active element that is controlled to be OFF when pixel potential is written from the signal line to the holding capacitance. The transistor N14 is controlled to be ON only for a certain period immediately after start of each frame during performing internal refresh operation of the memory display mode. Gray-scale potential, which has been inverted in logic within the circuit 1 (FIG. 3), is written to the holding capacitance Cs during a period where the thin film transistor N14 is controlled to be ON. A control line CTL24 is used for controlling the thin film transistor N14. The thin film transistor N14 corresponds to the third switch SW3 in FIG. 3.

Thin film transistors P11 and N15, and a capacitance C configure the circuit 1 in FIG. 3.

The thin film transistors P11 and N15 configure an inverter circuit (amplifier circuit). An input side of the inverter circuit including the thin film transistors P11 and N15 is connected to one main electrode of the thin film transistor N13. The inverter circuit may input gray-scale potential of the holding capacitance Cs when the transistor N13 is ON. Gray-scale potential of the holding capacitance Cs is stored in the capacitance C. While the capacitance C is explicitly disposed in FIG. 24, wiring capacitance may be used.

An output side of the inverter circuit including the thin film transistors P11 and N15 is connected to one main electrode of the thin film transistor N14.

In this circuit configuration, a single inverter circuit is used to achieve a refresh function and a logic inverting function. In this circuit configuration, the three thin-film transistors P12, N16 and N17 being used in FIG. 8 may be eliminated. Circuit area may be correspondingly reduced.

Even in the pixel structure shown in FIG. 24, when pixel potential is written from the signal line to the capacitive element, the thin film transistors N13 and N14 can be controlled to be OFF.

Figure 25:
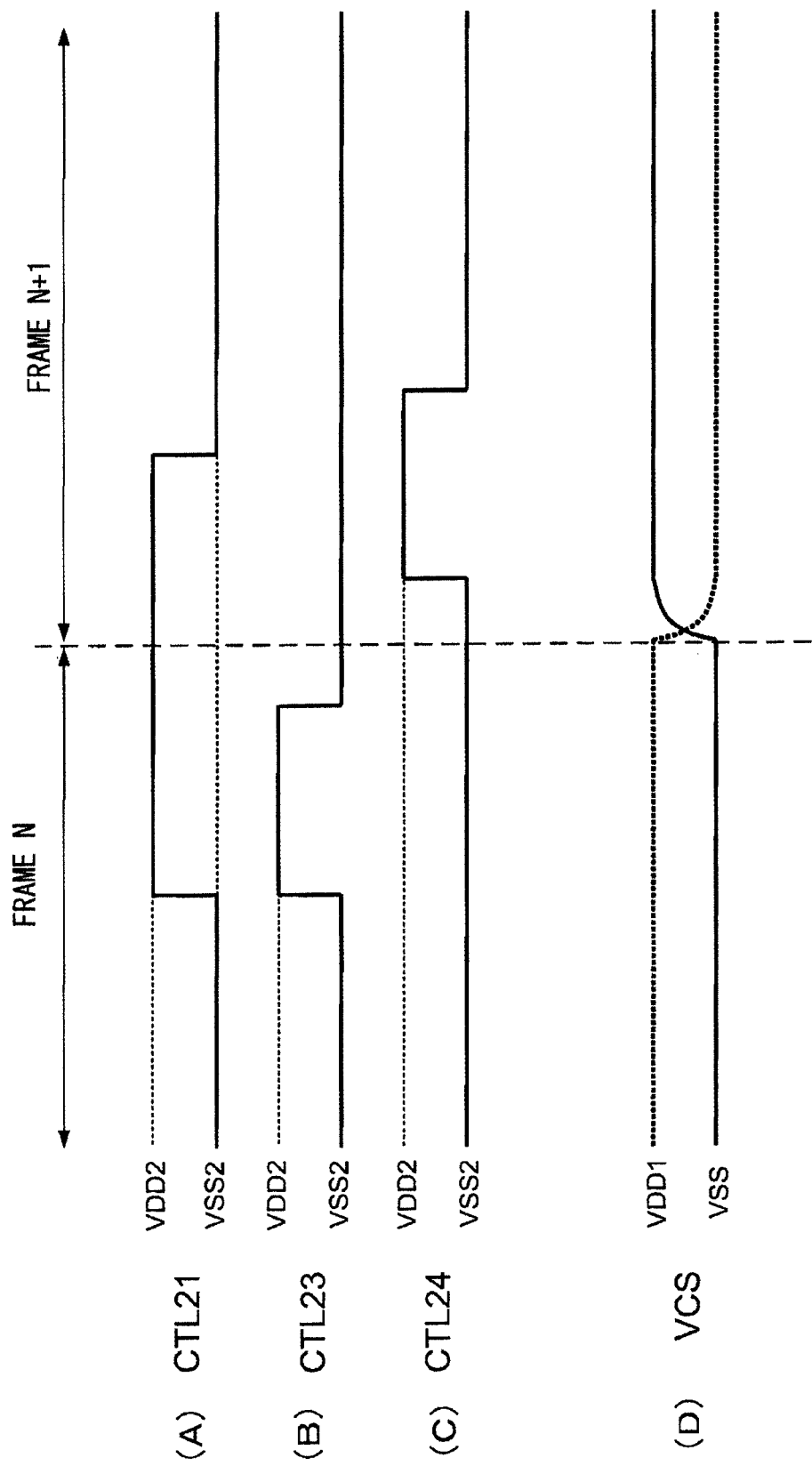
FIG. 25 is a diagram showing a detailed drive operation example in a memory display mode.

When internal refresh operation of the memory display mode is performed, drive control can be performed as shown in FIG. 25.

FIG. 25 shows a content of control operation of the control line drive section 37 for a certain scan line when internal refresh operation of the memory display mode is performed.

In FIG. 25, a preceding frame is shown as frame N, and a following frame is shown as frame N+1.

In FIG. 25, (A) shows a drive waveform of the control line CTL21. As shown in the figure, the control line CTL21 is controlled at high-level potential VDD2 for a certain period from a point immediately before end of the frame N to a point immediately after start of the frame N+1.

(B) shows a drive waveform of the control line CTL23. As shown in the figure, the control line CTL23 is controlled at the high-level potential VDD2 only for a certain period immediately before end of each frame. Gray-scale potential (PIX) read from the holding capacitance Cs is stored into the capacitance C within the circuit 1 (FIG. 3) during applying the high-level potential VDD2.

Inverted output of the gray-scale potential (PIX) is provided at an output end of the inverter circuit, and the gray-scale potential is inverted in logic at that time. Moreover, output amplitude of the gray-scale potential is changed into high-level potential VDD or low-level potential VSS. That is, self-refresh operation and self-inverting operation are performed. Again, the self-refresh operation is performed without charging or discharging the signal line DTL.

In FIG. 25, (C) shows a drive waveform of the control line CTL24. As shown in the figure, the control line CTL24 is controlled at the high-level potential VDD2 only for a certain period immediately after start of each frame. An output end of the inverter circuit is electrically connected to the holding capacitance Cs during applying the high-level potential VDD2, so that the gray-scale potential (PIX) inverted in logic is written to the holding capacitance.

(D) shows a waveform showing change in counter electrode potential VCS. As shown in the figure, a potential level is inverted in frames.

(E-2) Product Example (Electronic Device)

The described technique of applying drive voltage is distributed not only in a form of a liquid crystal panel, but also in a form of a product in which the liquid crystal panel is mounted on each of electronic devices. Hereinafter, an example where the liquid crystal panel is mounted on an electronic device is shown.

Figure 26:
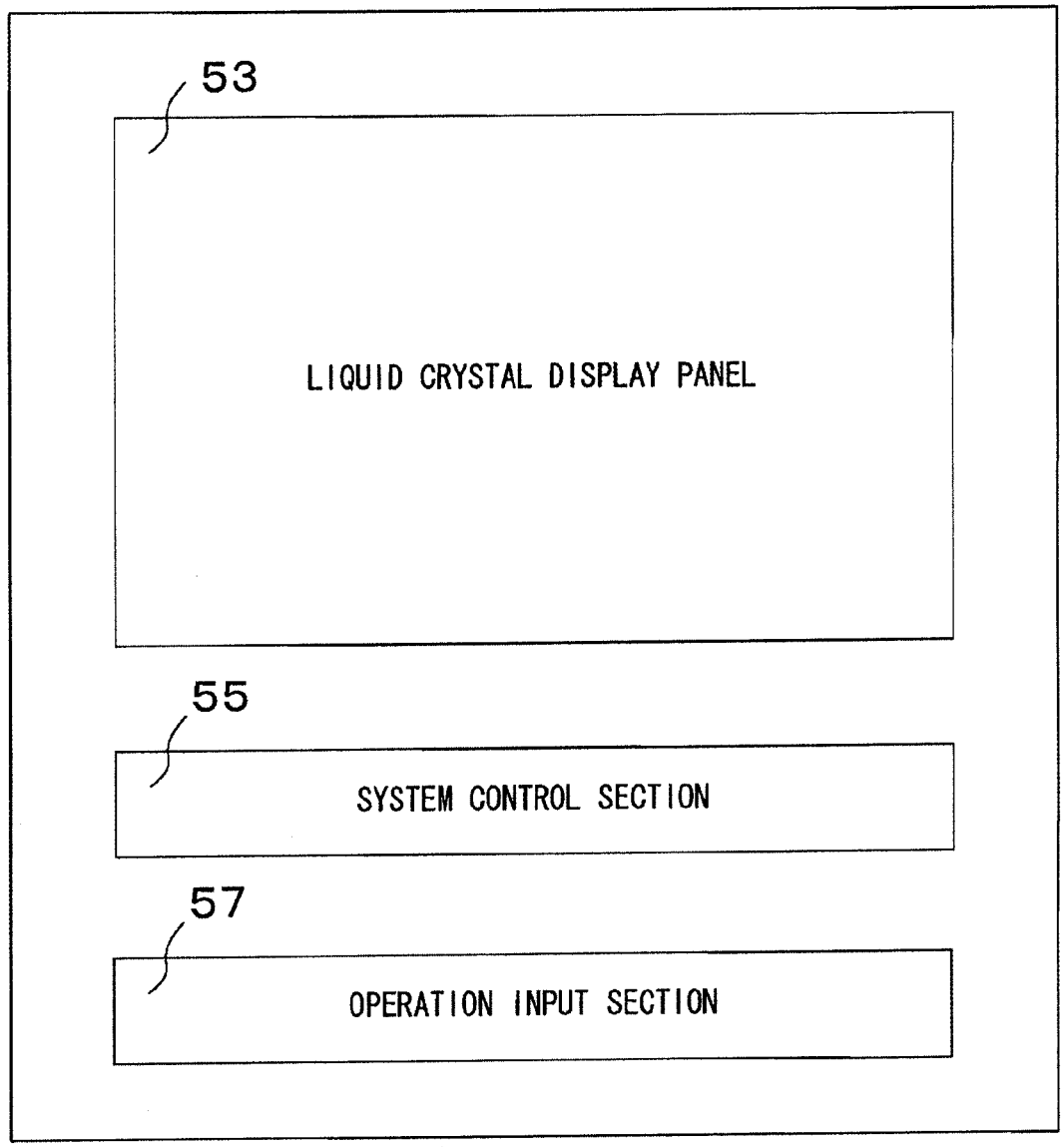
FIG. 26 is a diagram showing a functional configuration example of an electronic device.

FIG. 26 shows a conceptual configuration example of an electronic device 51. The electronic device 51 includes a liquid crystal panel 53 using the technique of applying drive voltage, a system control section 55, and an operation input section 57. A content of processing executed in the system control section 55 is different depending on a product form of the electronic device 51. The operation input section 57 is a device receiving operation input to the system control section 55. For example, a switch, a button or another mechanical interface, or a graphic interface is used for the operation input section 57.

The electronic device 51 is not limited to a device in a particular field as long as the device has a function of displaying a picture or a video image being generated within the device or being externally inputted.

Figure 27:
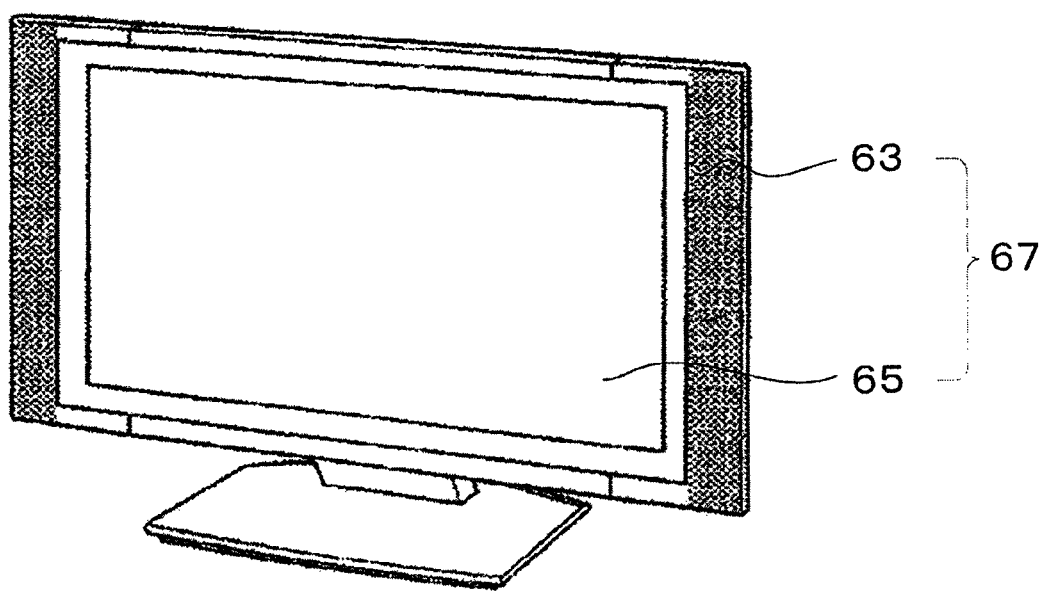
FIG. 27 is a diagram showing a product example of an electronic device.

FIG. 27 shows an example of outside appearance when another electronic device is a television receiver. A display screen 67 including a front panel 63, a filter glass 65 and the like is disposed in front of a housing of a television receiver 61.

Figure 28A:
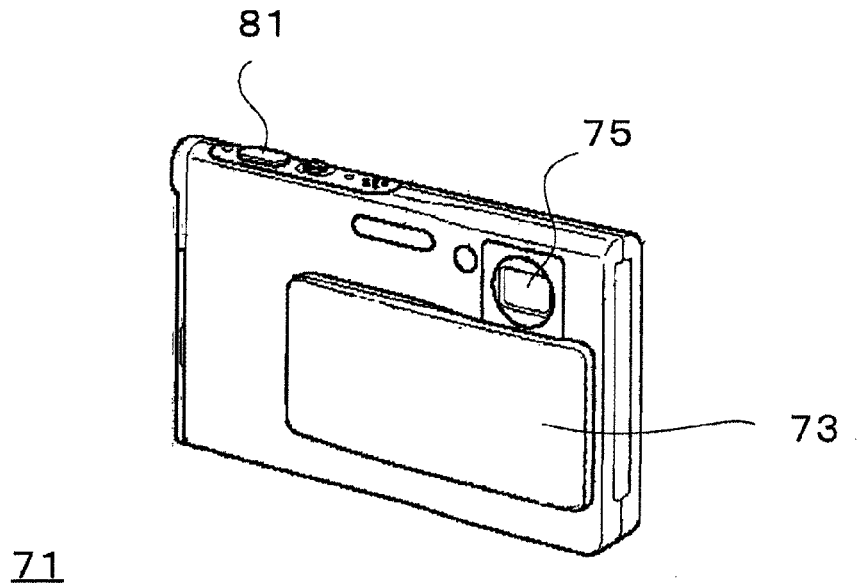
FIGS. 28A and 28B are diagrams showing a product example of the electronic device.
Figure 28B:
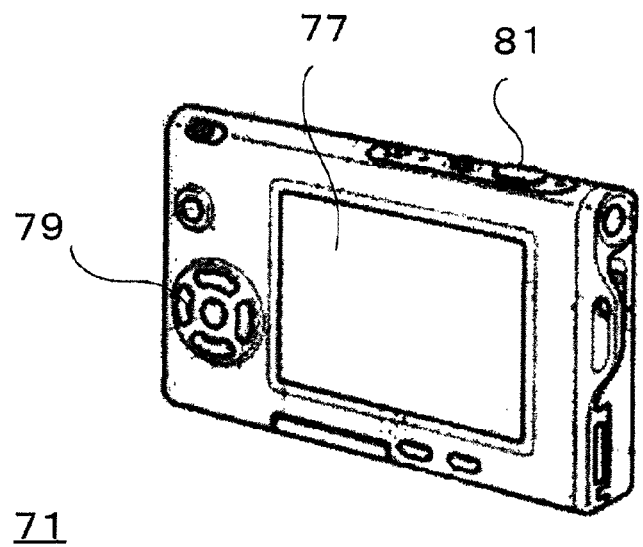

This type of electronic device 51, for example, may be a digital camera. FIGS. 28A and 28B show an example of outside appearance of a digital camera 71 respectively. FIG. 28A shows an outside example of the camera 71 on a front side (object side), and FIG. 28B shows an outside example of the camera 71 on a back side (photographer side). The digital camera 71 includes a protective cover 73, an imaging lens section 75, a display screen 77, a control switch 79, and a shutter button 81.

Figure 29:
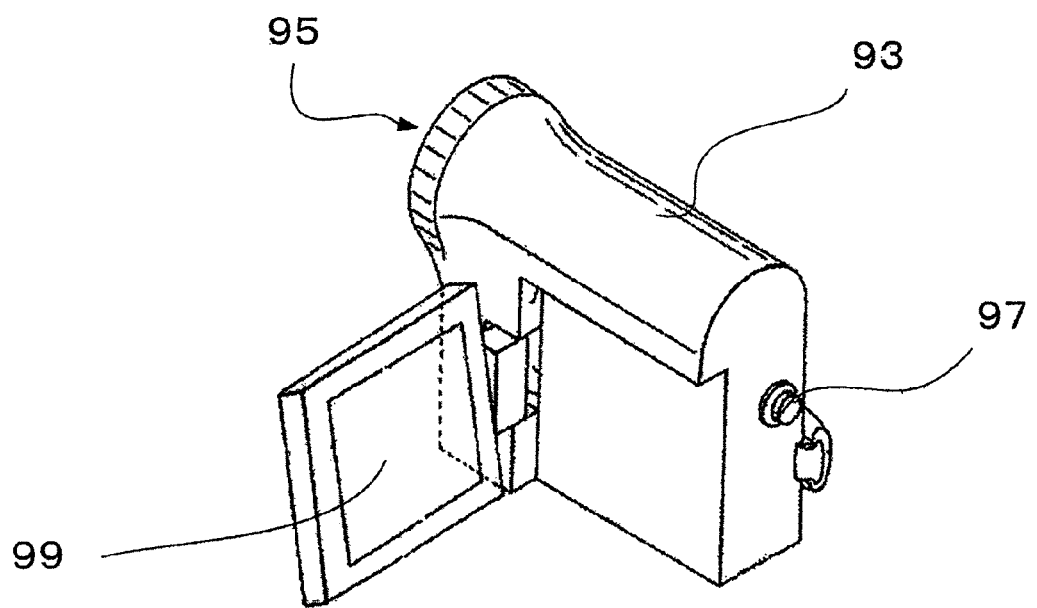
FIG. 29 is a diagram showing a product example of the electronic device.

Moreover, this type of electronic device 51, for example, may be a video camera. FIG. 29 shows an example of outside appearance of a video camera 91.

The video camera 91 includes an imaging lens 95 forming an image of an object in front of a body 93, a photographing start/stop switch 97, and a display screen 99.

Figure 30A:
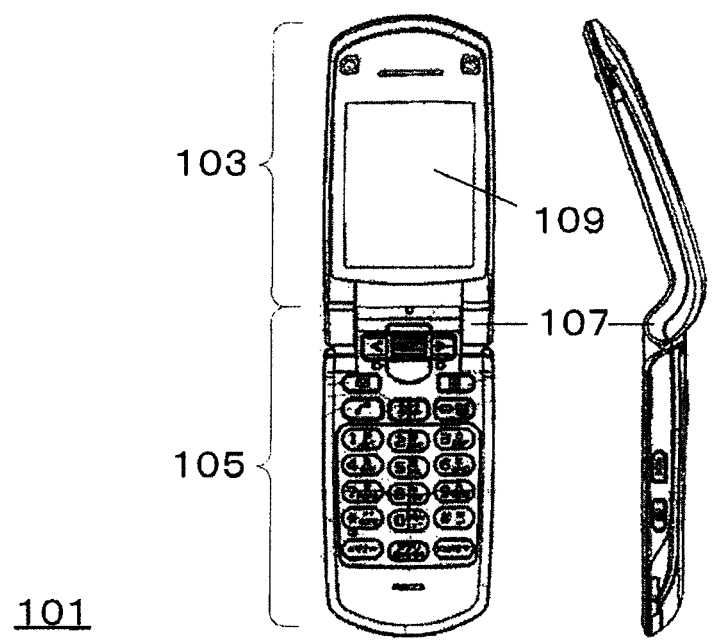
FIGS. 30A and 30B are diagrams showing a product example of the electronic device.
Figure 30B:
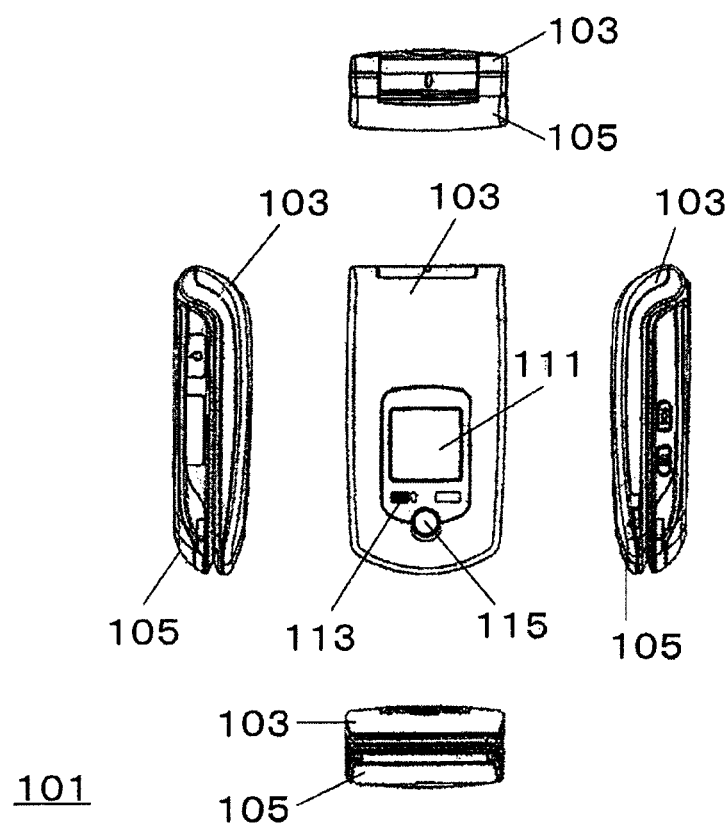

Moreover, this type of electronic device 51, for example, may be a mobile terminal device. FIGS. 30A and 30B show an example of outside appearance of a mobile phone 101 as the mobile terminal device. The mobile phone 101 shown in FIGS. 30A and 30B is of folding type. FIG. 30A shows an outside example of the mobile phone where a housing is opened, and FIG. 30B shows an outside example of the mobile phone where a housing is closed.

The mobile phone 101 includes an upper housing 103, a lower housing 105, a connection (hinge in this example) 107, a display screen 109, an auxiliary display screen 111, a picture light 113, and an imaging lens 115.

Figure 31:
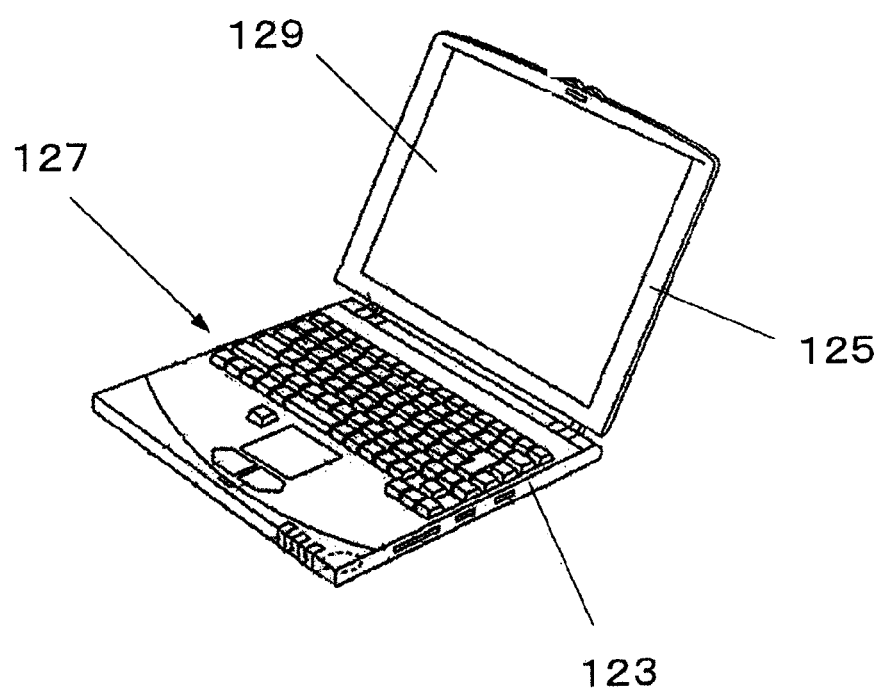
FIG. 31 is a diagram showing a product example of the electronic device.

Moreover, this type of electronic device 51, for example, may be a computer. FIG. 31 shows an example of outside appearance of a notebook computer 121.

The notebook computer 121 includes a lower housing 123, an upper housing 125, a keyboard 127, and a display screen 129.

In addition, this type of electronic device 51 may also be an audio player, a game machine, an electronic book, an electronic dictionary and the like.

(E-3) Others

Various modifications or alterations of the embodiments described above may be considered within a scope of the gist of the invention. Moreover, various modifications and applications of the embodiments are considered to be created based on the description of the specification, or various combinations of them may be considered.

Therefore, it should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2008-321652 filed in the Japan Patent Office on Dec. 17, 2008, the entire content of which is hereby incorporated by reference.

What is claimed is:

1. A liquid crystal display panel, comprising:
   a capacitive element holding a pixel potential representing a gray-scale level and provided in each of a plurality of pixels of the liquid crystal display;
   a first switch element having a first terminal, and having a second terminal connected to a signal line, the first switch element being controlled to be ON during a first operation period where pixel potential is written from the signal line to the capacitive element, and controlled to be OFF dliring a second operation period including readout of the pixel potential from the capacitive element, inversion and amplification of the read out pixel potential, and rewriting of the inverted-amplified pixel potential to the capacitive element which are sequentially performed;
   a second switch element having a first terminal connected to a first terminal of the first switch element, the second switch element being controlled to be OFF during the first operation period, and controlled to be ON during a readout period where pixel potential stored in the capacitive element is read out, the readout period being one part of the second operation period;
   a third switch element having a first terminal connected to the first terminal of the first switch element, the third switch element being controlled to be OFF during the first operation period, and controlled to be ON during a write period where the pixel potential is written into the capacitive element, the write period being another part of the second operation period;
   a fourth switch element having a first terminal connected to one electrode of the capacitive element and a drive electrode in a liquid crystal element, and a second terminal connected to the first terminal of the first switch element, the first terminal of the second switch element, and the first terminal of the third switch element; and a circuit restoring a logic level of pixel potential read out from the capacitive element through the second switch element during the readout period, and then writing a logically-inverted output of the restored logic level to the capacitive element through the third switch element during the write period, wherein the circuit has one inverter circuit having an input terminal that has a capacitance and is connected to a second terminal of the second switch element without interposing other inverters, and an output terminal that is connected to a second terminal of the third switch element without interposing other inverters, and each of the input terminal and the output terminal is not connected to other inverters, wherein the circuit is configured to upon the readout period, store the logic level of pixel potential read out from the capacitive element in the capacitance of the input terminal to invert the logic level stored in the capacitance to the logically-inverted output via the inverter circuit, and upon the write period, transfer the logically-inverted output from the output terminal to the capacitive element to write the logically-inverted output in the capacitive element, wherein the capacitive element operates as a holding capacitor of a DRAM structure and self-refresh is performed without charging or discharging the signal line, wherein the first terminal of the first switch element is connected to the one electrode of the capacitive element and the drive electrode in the liquid crystal element through the fourth switch element, and further wherein the circuit is provided between the first switch element and the fourth switch element, reads out the logic level of pixel potential from the capacitive element through the fourth switch element and the second switch element during the readout period, and writes the logically-inverted output to the capacitive element through the third switch element and the fourth switch element during the write period.

2. The liquid crystal display panel according to claim 1, wherein the circuit is provided, one per one pixel.

3. The liquid crystal display panel according to claim 1, wherein the circuit is provided, one per a plurality of pixels.

4. An electronic device, comprising:
a liquid crystal display panel;
a system control section controlling the electronic device; and
an input operation section performing input operation to the system control section,
the liquid crystal display panel including:
a capacitive element holding a pixel potential representing a gray-scale level and provided in each of a plurality of pixels of the liquid crystal display;
a first switch element having a first terminal, and having a second terminal connected to a signal line, the first switch element being controlled to be ON during a first operation period where pixel potential is written from the signal line to the capacitive element, and controlled to be OFF during a second operation period including readout of the pixel potential from the capacitive element, inversion and amplification of the read out pixel potential, and rewriting of the inverted-amplified pixel potential to the capacitive element which are sequentially performed;

a second switch element having a first terminal connected to a first terminal of the first switch element, the second switch element being controlled to be OFF during the first operation period, and controlled to be ON during a readout period where pixel potential stored in the capacitive element is read out, the readout period being one part of the second operation period;

a third switch element having a first terminal connected to the first terminal of the first switch element, the third switch element being controlled to be OFF during the first operation period, and controlled to be ON during a write period where the pixel potential is written into the capacitive element, the write period being another part of the second operation period;

a fourth switch element having a first terminal connected to one electrode of the capacitive element and a drive electrode in a liquid crystal element, and a second terminal connected to the first terminal of the first switch element, the first terminal of the second switch element, and the first terminal of the third switch element; and a circuit restoring a logic level of pixel potential read out from the capacitive element through the second switch element during the readout period, and then writing logically-inverted output of the restored logic level to the capacitive element through the third switch element during the write period, wherein the circuit has one inverter circuit having an input terminal that has a capacitance and is connected to a second terminal of the second switch element without interposing other inverters, and an output terminal that is connected to a second terminal of the third switch element without interposing other inverters, and each of the input terminal and the output terminal is not connected to other inverters, wherein the circuit is configured to:

upon the readout period, store the logic level of pixel potential read out from the capacitive element in the capacitance of the input terminal to invert the logic level stored in the capacitance to the logically-inverted output via the inverter circuit, and upon the write period, transfer the logically-inverted output from the output terminal to the capacitive element to write the logically-inverted output in the capacitive element, wherein the capacitive element operates as a holding capacitor of a DRAM structure and self-refresh is performed without charging or discharging the signal line, wherein the first terminal of the first switch element is connected to the one electrode of the capacitive element and the drive electrode in the liquid crystal element through the fourth switch element, and further wherein the circuit is provided between the first switch element and the fourth switch element, reads out the logic level of pixel potential from the capacitive element through the fourth switch element and the second switch element during the readout period, and writes the logically-inverted output to the capacitive element through the third switch element and the fourth switch element during the write period.

5. A liquid crystal display panel, comprising:
a plurality of capacitive elements being respectively provided corresponding to a plurality of sub-pixels provided in each of a plurality of pixels of the liquid crystal display, each of the plurality of capacitive elements holding a pixel potential representing a corresponding gray-scale level;

a first switch element having a first terminal, and having a second terminal connected to a signal line, the first switch element being controlled to be ON during a first operation period where pixel potential is written from the signal line to any one of the plurality of capacitive elements, and controlled to be OFF during a second operation period including readout of the pixel potential from any one of the plurality of capacitive elements, inversion and amplification of the read out pixel potential, and rewriting of the inverted-amplified pixel potential to any one of the plurality of capacitive elements which are sequentially performed;

a second switch element having a first terminal connected to a first terminal of the first switch element, the second switch element being controlled to be OFF during the first operation period, and controlled to be ON during a readout period where pixel potential stored in any one of the plurality of capacitive elements is read out, the readout period being one part of the second operation period;

a third switch element having a first terminal connected to the first terminal of the first switch element, the third switch element being controlled to be OFF during the first operation period, and controlled to be ON during a write period where the pixel potential is written into any one of the plurality of capacitive elements, the write period being another part of the second operation period;

a plurality of fourth switch elements corresponding to the plurality of capacitive elements respectively, the plurality of fourth switch elements each having a first terminal and a second terminal, the first terminal of each of the plurality of fourth switch elements being connected to one electrode of a corresponding one of the plurality of capacitive elements and a drive electrode in a corresponding one of a plurality of liquid crystal elements, the second terminal of each of the plurality of fourth switch elements being connected to the first terminal of the first switch element, the first terminal of the second switch element, and the first terminal of the third switch element; and a circuit that is shared among the plurality of capacitive elements, the circuit restoring a logic level of pixel potential read out from any one of the plurality of capacitive elements through the second switch element during the readout period, the circuit writing logically-inverted output of the restored logic level to any one of the plurality of capacitive elements through the third switch element during the write period, wherein the circuit has one inverter circuit having an input terminal that has a capacitance and is connected to a second terminal of the second switch element without interposing other inverters and an output terminal that is connected to a second terminal of the third switch element without interposing other inverters, and each of the input terminal and the output terminal is not connected to other inverters, wherein the circuit is configured to upon the readout period, store the logic level of pixel potential read out from any one of the plurality of capacitive elements in the capacitance of the input terminal to invert the logic level stored in the capacitance to the logically-inverted output via the inverter circuit, and upon the write period, transfer the logically-inverted output from the output terminal to any one of the plurality of capacitive elements to write the logically-inverted output in the any one of the plurality of capacitive elements, wherein the plurality of capacitive elements operate as a holding capacitor of a DRAM structure and self-refresh is performed without charging or discharging the signal line, wherein the first terminal of the first switch element is connected to each one electrode of the plurality of the capacitive elements and each drive electrode in the plurality of liquid crystal elements through the plurality of fourth switch elements, and further wherein the circuit is provided between the first switch element and the plurality of fourth switch elements, reads out the logic level of pixel potential from any one of the plurality of capacitive elements through a corresponding one of the plurality of forth switch elements and the second switch element during the readout period, and writes the logically-inverted output to any one of the plurality of capacitive elements through the third switch element and a corresponding one of the plurality of fourth switch element during the write period.

6. An electronic device, comprising:

a liquid crystal display panel;

a system control section controlling the electronic device; and an input operation section performing input operation to the system control section, the liquid crystal display panel including:

a plurality of capacitive elements being respectively provided corresponding to a plurality of sub-pixels provided in each of a plurality of pixels of the liquid crystal display, each of the plurality of capacitive elements holding pixel potential representing a corresponding gray-scale level;

a first switch element having a first terminal connected, and having a second terminal connected to a signal line, the first switch element being controlled to be ON during a first operation period where pixel potential is written from the signal line to any one of the plurality of capacitive elements, and controlled to be OFF during a second operation period including readout of the pixel potential from any one of the plurality of capacitive elements, inversion and amplification of the read out pixel potential, and rewriting of the inverted-amplified pixel potential to any one of the plurality of capacitive elements which are sequentially performed;

a second switch element having a first terminal connected to a first terminal of the first switch element, the second switch element being controlled to be OFF during the first operation period, and controlled to be ON during a readout period where pixel potential stored in any one of the plurality of capacitive elements is read out, the readout period being one part of the second operation period;

a third switch element having a first terminal connected to the first terminal of the first switch element, the third switch element being controlled to be OFF during the first operation period, and controlled to be ON during a write period where the pixel potential is written into any one of the plurality of capacitive elements, the write period being another part of the second operation period;

a plurality of fourth switch elements corresponding to the plurality of capacitive elements respectively, the plurality of fourth switch elements each having a first terminal and a second terminal, the first terminal of each of the plurality of fourth switch elements being connected to one electrode of a corresponding one of the plurality of capacitive elements and a drive electrode in a corresponding one of a plurality of liquid crystal elements, the second terminal of each of the plurality of fourth switch elements being connected to the first terminal of the first switch element, the first terminal of the second switch element, and the first terminal of the third switch element; and a circuit that is shared among the plurality of capacitive elements, the circuit restoring a logic level of pixel potential read out from any one of the plurality of capacitive elements through the second switch element during the readout period, the circuit writing logically-inverted output of the restored logic level to any one of the plurality of capacitive elements through the third switch element during the write period, wherein the circuit has one inverter circuit having an input terminal that has a capacitance and is connected to a second terminal of the second switch element without interposing other inverters, and an output terminal that is connected to a second terminal of the third switch element without interposing other inverters, and each of the input terminal and the output terminal is not connected to other inverters, wherein the circuit is configured to upon the readout period, store the logic level of pixel potential read out from any one of the plurality of capacitive elements in the capacitance of the input terminal to invert the logic level stored in the capacitance to the logically-inverted output via the inverter circuit, and upon the write period, transfer the logically-inverted output from the output terminal to any one of the plurality of capacitive elements to write the logically-inverted output in the any one of the plurality of capacitive elements, wherein the plurality of capacitive elements operate as a holding capacitor of a DRAM structure and self-refresh is performed without charging or discharging the signal line, wherein the first terminal of the first switch element is connected to the one electrode of the capacitive elements and each drive electrode in the plurality of liquid crystal elements through the plurality of fourth switch elements, and further wherein the circuit is provided between the first switch element and the plurality of fourth switch elements, reads out the logic level of pixel potential from any one of the plurality of capacitive elements through a corresponding one of the plurality of fourth switch elements and the second switch element during the readout period, and writes the logically-inverted output to any one of the plurality of capacitive elements through the third switch element and a corresponding one of the plurality of fourth switch element during the write period.

* * * * *